United States Patent
Frenne et al.

(10) Patent No.: US 11,134,513 B2
(45) Date of Patent: *Sep. 28, 2021

(54) RADIO ACCESS NODE, COMMUNICATION TERMINAL AND METHODS PERFORMED THEREIN

(71) Applicant: Telefonaktiebolaget LM Ericsson (publ), Stockholm (SE)

(72) Inventors: Mattias Frenne, Uppsala (SE); Jung-Fu Cheng, Fremont, CA (US); Daniel Larsson, Lund (SE); Havish Koorapaty, Saratoga, CA (US); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,335

(22) Filed: Aug. 24, 2020

(65) Prior Publication Data

US 2020/0396762 A1 Dec. 17, 2020

Related U.S. Application Data

(63) Continuation of application No. 14/908,377, filed as application No. PCT/SE2015/050954 on Sep. 10, 2015, now Pat. No. 10,785,790.

(Continued)

(51) Int. Cl.
*H04W 72/12* (2009.01)
*H04W 16/14* (2009.01)
(Continued)

(52) U.S. Cl.
CPC ......... *H04W 72/1289* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

| | | |
|---|---|---|
| 2002/0106987 A1 | 8/2002 | Linden |
| 2007/0277211 A1 | 11/2007 | Hwang |

(Continued)

FOREIGN PATENT DOCUMENTS

WO 2012116489 A1 9/2012

OTHER PUBLICATIONS

"Author Unknown, ""Technical Specification Group Radio Access Network; Evolved Universal Terrestrial Radio Access (E-UTRA);Physical Channels and Modulation(Release 11),"" Technical Specification 36.211, Version 11.3.0, 3GPP Organizational Partners, Jun. 2013, 108 pages".

(Continued)

*Primary Examiner* — Bunjob Jaroenchonwanit
(74) *Attorney, Agent, or Firm* — Withrow & Terranova, PLLC

(57) ABSTRACT

Embodiments herein relate to a communication terminal (10) for handling communication, which communication terminal (10) is being served by a radio access node (12, 13) in a first cell (11) on a carrier of a licensed frequency spectrum and cross-carrier scheduled in a second cell (14) on a carrier of an unlicensed frequency spectrum by the radio access node (12, 13) via the first cell (11). The communication terminal receives an indication that data may be scheduled for the communication terminal (10) on a data channel in the second cell (14). The communication terminal attempts to detect presence of the data channel intended for the communication terminal (10). Then, in case the communication terminal (10) detects presence of the data channel intended for the communication terminal (10), (Continued)

the communication terminal (10) decodes the data channel. In case the communication terminal (10) does not detect presence of the data channel intended for the communication terminal (10), the communication terminal (10) indicates a non-detection of the data channel to the radio access node (12, 13).

20 Claims, 12 Drawing Sheets

Related U.S. Application Data

(60) Provisional application No. 62/048,289, filed on Sep. 10, 2014.

(51) Int. Cl.
 *H04L 5/00* (2006.01)
 *H04W 72/04* (2009.01)

(52) U.S. Cl.
 CPC ........... *H04L 5/0055* (2013.01); *H04W 16/14* (2013.01); *H04W 72/042* (2013.01); *H04W 72/0446* (2013.01)

(56) References Cited

U.S. PATENT DOCUMENTS

| | | |
|---|---|---|
| 2010/0008286 A1 | 1/2010 | Abedi |
| 2010/0202382 A1 | 8/2010 | Park et al. |
| 2011/0019776 A1 | 1/2011 | Zhang et al. |
| 2011/0075624 A1 | 3/2011 | Papasakellariou et al. |
| 2011/0243066 A1 | 10/2011 | Nayeb Nazar et al. |
| 2011/0305152 A1 | 12/2011 | Ofuji et al. |
| 2012/0076089 A1 | 3/2012 | Kawamura et al. |
| 2012/0113827 A1 | 5/2012 | Yamada et al. |
| 2012/0176957 A1 | 6/2012 | Chen et al. |
| 2012/0307775 A1 | 12/2012 | Chung et al. |
| 2012/0327884 A1 | 12/2012 | Seo et al. |
| 2013/0100918 A1 | 4/2013 | Hong |
| 2013/0114556 A1 | 5/2013 | Yang et al. |
| 2013/0142121 A1 | 6/2013 | Han et al. |
| 2013/0230033 A1 | 9/2013 | Lee et al. |
| 2014/0029561 A1 | 1/2014 | Kim et al. |
| 2014/0036881 A1 | 2/2014 | Kim et al. |
| 2014/0036889 A1 | 2/2014 | Kim et al. |
| 2014/0112289 A1 | 4/2014 | Kim et al. |
| 2014/0119313 A1 | 5/2014 | Yang et al. |
| 2014/0211768 A1* | 7/2014 | He .................. H04L 1/1854 370/336 |
| 2015/0124771 A1* | 5/2015 | Ko .................. H04L 1/0027 370/329 |
| 2015/0172039 A1 | 6/2015 | Kim et al. |
| 2016/0255648 A1 | 9/2016 | Frenne et al. |
| 2016/0373233 A1 | 12/2016 | Pelletier et al. |

OTHER PUBLICATIONS

"Author Unknown, ""Technical Specification Group Radio Access Network; Evolved Universal Terrestrial Radio Access (E-UTRA);Physical channels and modulation(Release 12),"" Technical Specification 36.211, Version 12.2.0, 3GPP Organizational Partners, Jun. 2014, 121 pages".

Author Unknown, "Technical Specification Group Radio Access Network; Evolved Universal Terrestrial Radio Access (E-UTRA); Physical layer procedures (Release 11)," Technical Specification 36.213, Version 11.3.0, 3GPP Organizational Partners, Jun. 2013, 176 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.3.0, 3GPP Organizational Partners, Mar. 2013, 344 pages.

Non-Final Office Action for U.S. Appl. No. 14/908,377, dated Aug. 10, 2017, 20 pages.

Final Office Action for U.S. Appl. No. 14/908,377, dated Feb. 14, 2018, 19 pages.

Advisory Action for U.S. Appl. No. 14/908,377, dated Jun. 7, 2018, 3 pages.

Final Office Action for U.S. Appl. No. 14/908,377, dated Jul. 30, 2018, 13 pages.

Non-Final Office Action for U.S. Appl. No. 14/908,377, dated Nov. 7, 2018, 13 pages.

Final Office Action for U.S. Appl. No. 14/908,377, dated Aug. 21, 2019, 13 pages.

Advisory Action for U.S. Appl. No. 14/908,377, dated Nov. 1, 2019, 3 pages.

Examination Report for European Patent Application No. 15771293.6, dated Feb. 16, 2018, 4 pages.

Intention to Grant for European Patent Application No. 15771293.6, dated Aug. 2, 2019, 108 pages.

Extended European Search Report for European Patent Application No. 19214789.0, dated Mar. 13, 2020, 9 pages.

International Search Report and Written Opinion for International Patent Application No. PCT/SE2015/050954, dated Dec. 2, 2015, 11 pages.

\* cited by examiner

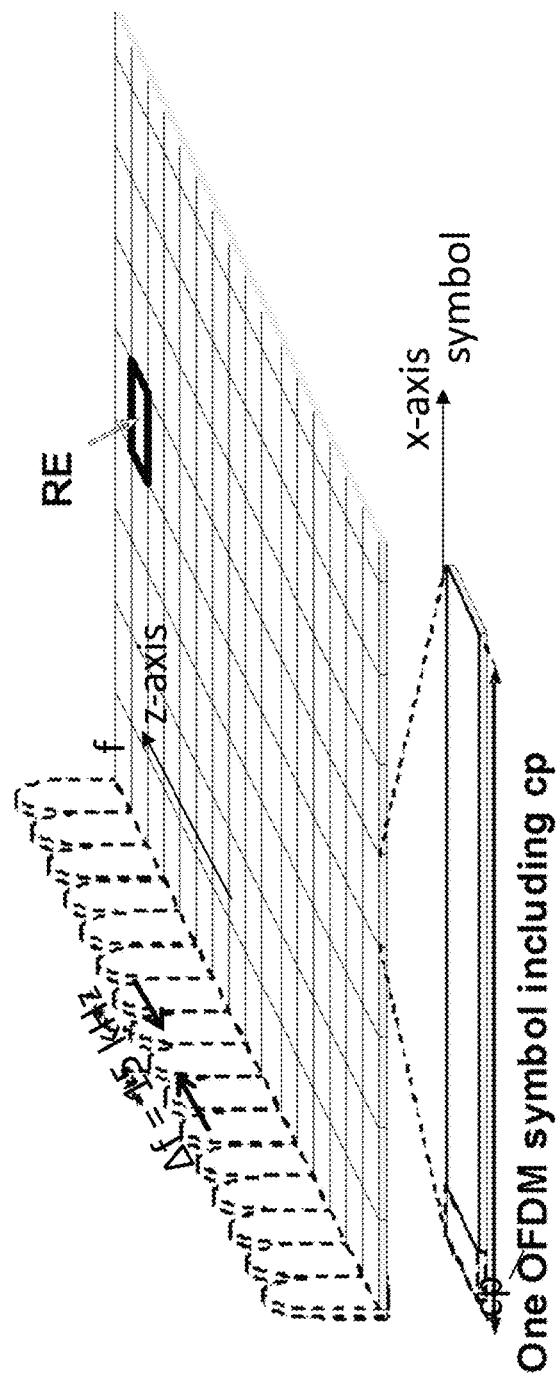
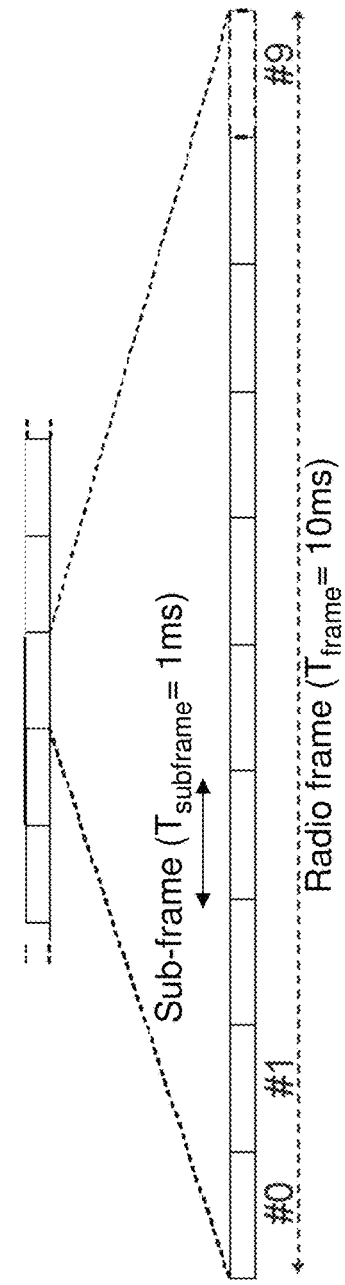
Fig. 1 PRIOR ART
Fig. 2 PRIOR ART

RADIO ACCESS NODE, COMMUNICATION TERMINAL AND METHODS PERFORMED THEREIN

This application is a continuation of U.S. application Ser. No. 14/908,377, filed Jan. 28, 2016, now U.S. Pat. No. 10,785,790, which is a 35 U.S.C. § 371 national phase filing of International Application No. PCT/SE2015/050954, filed Sep. 10, 2015, which claims the benefit of U.S. Provisional Application No. 62/048,289, filed Sep. 10, 2014, the disclosures of which are incorporated herein by reference in their entireties.

TECHNICAL FIELD

Embodiments herein relate to a radio access node, a communication terminal and methods performed therein. In particular embodiments herein relate to scheduling a control channel and/or a data channel to a communication terminal.

BACKGROUND

In a typical wireless communication network, communication terminals, also known as wireless devices and/or user equipments (UEs), communicate via a Radio Access Network (RAN) to one or more core networks. The RAN covers a geographical area which is divided into cell areas, with each cell area being served by a radio access node such as a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not co-located. Each cell is identified by an identity within the local radio area, which is broadcast in the cell. Another identity identifying the cell uniquely in the whole wireless communication network is also broadcasted in the cell. One radio access node may have one or more cells. The radio access nodes communicate over the air interface operating on radio frequencies with the communication terminals within range of the radio access nodes with downlink transmissions towards the communication terminals and uplink transmission from the communication terminals.

A Universal Mobile Telecommunications System (UMTS) is a third generation wireless communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several radio access nodes may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio access nodes are directly connected to the EPC core network rather than to RNCs. In general, in E-UTRAN/LTE the functions of a RNC are distributed between the radio access nodes, e.g. eNodeBs in LTE, and the core network. As such, the Radio Access Network (RAN) of an EPS has an essentially "flat" architecture comprising radio access nodes without reporting to RNCs.

The 3GPP initiative "License Assisted Access" (LAA) aims to allow LTE equipment to operate in an unlicensed 5 GHz radio spectrum. The unlicensed 5 GHz spectrum is used as an extension to the licensed spectrum. Accordingly, communication terminals connect in the licensed spectrum to a primary cell (PCell), and use carrier aggregation to benefit from additional transmission capacity in the unlicensed spectrum in a secondary cell (SCell). To reduce the changes required for aggregating licensed and unlicensed spectrum, an LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called Listen-Before-Talk (LBT) method needs to be applied. Today, the unlicensed 5 GHz spectrum is mainly used by communication terminals implementing the IEEE 802.11 Wireless Local Area Network (WLAN) standard. This standard is known under its marketing brand "Wi-Fi."

IEEE 802.11 equipment, also called WLAN equipment, uses a contention based medium access scheme. This scheme does not allow a wireless medium to be reserved at specific instances of time. Instead, IEEE 802.11 equipment or IEEE 802.11 compliant devices only support the immediate reservation of the wireless medium following the transmission of at least one medium reservation message, e.g. Request to Send (RTS) or Clear to Send (CTS) or others. To allow the Licensed Assisted (LA)-LTE frame in the secondary cell to be transmitted at recurring time intervals that are mandated by the LTE frame in the primary cell, the LAA system transmits at least one of the aforementioned medium reservation messages to block surrounding IEEE 802.11 equipment from accessing the wireless medium.

LTE uses Orthogonal Frequency-Division Multiplexing (OFDM) in the downlink (DL) and Discrete Fourier Transform (DFT)-spread OFDM in the uplink (UL). A basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized subframes denoted #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. A pair of two adjacent resource blocks in time direction covering 1.0 ms, is known as a resource block pair. Resource blocks are numbered in the frequency domain, starting with resource block 0 from one end of the system bandwidth. For normal cyclic prefix, one subframe consists of 14 OFDM symbols. The duration of each OFDM symbol is approximately 71.4 μs.

Downlink and uplink transmissions are dynamically scheduled, i.e. in each subframe the radio access node transmits control information about to or from which communication terminal data is transmitted and upon which resource blocks the data is transmitted, in the current downlink subframe. The control information for a given communication terminal is transmitted using one or multiple Physical Downlink Control Channels (PDCCH), and this control signaling is typically transmitted in one or more of the first OFDM symbols, e.g. 1, 2, 3 or 4 OFDM symbols covering a control region, in each subframe and the number n=1, 2, 3 or 4 is known as the Control Format Indicator (CFI). Typically the control region may comprise many PDCCH carrying control information to multiple communication terminals simultaneously. A downlink system with 3 OFDM symbols allocated for control signaling, for example the PDCCH, is illustrated in FIG. 3 and which three OFDM symbols form a control region. The resource elements used for control signaling are indicated with wave-formed lines and resource elements used for reference symbols are indicated with diagonal lines. Frequencies f or subcarriers are defined along a z-axis and symbols are defined along an x-axis. The downlink subframe also contains common reference symbols, which are known to the receiver and used for channel estimation for coherent demodulation of e.g. the control information. A downlink system with CFI=3 OFDM symbols as control region is illustrated in FIG. 3.

From LTE Rel-11 onwards above described resource assignments can also be scheduled on the enhanced Physical Downlink Control Channel (EPDCCH). For Rel-8 to Rel-10 only PDCCH is available.

The reference symbols shown in the FIG. 3 are the Cell specific Reference Symbols (CRS) and are used to support multiple functions including fine time and frequency synchronization and channel estimation for certain transmission modes.

In a wireless communication network there is a need to measure the channel conditions in order to know what transmission parameters to use. These parameters include, e.g., modulation type, coding rate, transmission rank, and frequency allocation. This applies to uplink (UL) as well as downlink (DL) transmissions.

The scheduler that makes the decisions on the transmission parameters is typically located in the radio access node e.g. the base station (eNB). Hence, the radio access node can measure channel properties of the UL directly using known reference signals that the communication terminals transmit. These measurements then form a basis for the UL scheduling decisions that the radio access node makes, which are then sent to the communication terminals via a downlink control channel.

However, for the DL the radio access node is unable to measure any channel parameters. Rather, it must rely on information that the communication terminals may gather and subsequently send back to the radio access node. This so-called Channel-State Information (CSI) is obtained in the communication terminals by measuring on known reference symbols e.g. Channel-State Information Reference Symbols (CSI-RS), transmitted in the DL. See ref. 36.211 section 6.10.5 version 12.2.0, which pertains to LTE specifically.

The PDCCH/EPDCCH is used to carry Downlink Control Information (DCI) in a DCI message such as scheduling decisions and power-control commands. More specifically, the DCI comprises:

- Downlink scheduling assignments, including Physical Downlink Shared Channel (PDSCH) resource indication, transport format, Hybrid-Automatic Repeat Request (HARQ) information, and control information related to spatial multiplexing, if applicable. A downlink scheduling assignment also includes a command for power control of the Physical Uplink Control Channel (PUCCH) used for transmission of HARQ acknowledgements (ACK) in response to downlink scheduling assignments.
- Uplink scheduling grants, including Physical Uplink Shared Channel (PUSCH) resource indication, transport format, and HARQ-related information. An uplink scheduling grant also includes a command for power control of the PUSCH.
- Power-control commands for a set of communication terminals as a complement to the commands included in the scheduling assignments/grants.

One PDCCH/EPDCCH carries one DCI message containing one of the groups of information listed above. As multiple communication terminals may be scheduled simultaneously, and each communication terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation may be used, where the code rate of the PDCCH/EPDCCH is selected by adapting the resource usage for the PDCCH/EPDCCH, to match the radio-channel conditions.

Here follows a discussion on a starting OFDM symbol for PDSCH and EPDCCH within the subframe. The OFDM symbols in a first slot are numbered from 0 to 6.

For transmissions modes 1-9, the starting OFDM symbol in the first slot of the subframe for EPDCCH can be configured by higher layer signaling and the same starting OFDM symbol is in this case used for the corresponding scheduled PDSCH. Both sets have the same EPDCCH starting symbol for these transmission modes. If not configured by higher layers, the starting OFDM symbol for both PDSCH and EPDCCH is given by the CFI value signalled in Physical Control Format Indicator Channel (PCFICH).

Multiple starting OFDM symbol candidates may be achieved by configuring the communication terminal in transmission mode 10, by having multiple EPDCCH Physical Resource Block (PRB) configuration sets where for each set the starting OFDM symbol in the first slot in a subframe for EPDCCH can be configured by higher layers to be a value from {1,2,3,4}, independently for each EPDCCH set. If a set is not higher layer configured to have a fixed starting OFDM symbol, then the EPDCCH starting OFDM symbol for this set follows the CFI value received in PCFICH.

For transmission mode 10 and when receiving DCI format 2D, the starting OFDM symbol in the first slot of a subframe for PDSCH is dynamically signaled in the DCI message to the communication terminal using two "PDSCH Resource Element (RE) Mapping and QCL Indicator", PQI for short, bits in the DCI format 2D. Up to four possible OFDM start values is thus possible to signal to the communication terminal and the OFDM start values may be taken from the set {1,2,3,4}. Which OFDM start value each of the four states of the PQI bits represents, is configured by Radio Resource Control (RRC) signaling to the communication terminal. For example, it is possible that e.g. PQI="00" and PQI="01" represent PDSCH start symbol 1 and PQI="10" and PQI="11" represents PDSCH start symbol 2. It is also possible to assign a PQI state, e.g. "00", to indicate that the value CFI in the PCFICH should be used for PDSCH start symbol assignment.

Moreover, in transmission mode 10, when EPDCCH is configured and when DCI format 2D is received, the starting OFDM symbol for each of the two EPDCCH sets re-use the PDSCH start symbol of a PQI state configured for PDSCH to the communication terminal. Note that these EPDCCH start symbols are not dynamically varying, in which case they would have been varying from subframe to subframe, but are semi-statically configured by higher layer signaling, and taken from the higher layer configured parameters related to the PQI states. For example, if PQI="00" and PQI="01" represent PDSCH start symbol 1 and PQI="10" and PQI="11" represent PDSCH start symbol 2, then EPDCCH set 1 and 2 can only start at either OFDM symbol 1 or 2 in this example since these are the start values used for PDSCH. Which one is used for each EPDCCH set is also conveyed by RRC signaling to the communication terminal when configuring the EPDCCH parameters. For example EPDCCH set 1 use start symbol 1 and EPDCCH set 2 use start symbol 2 in this non-limiting example. Note that the start symbols for each EPDCCH set is fixed until it is re-configured in a RRC re-configuration whereas a PDSCH scheduled from any of the two EPDCCH sets can be signaled dynamically to start at either symbol 1 or 2, using the PQI bits.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable communication terminals compared to many LTE legacy communication terminals. Therefore, it is necessary to assure an efficient use of a wide carrier also for legacy communication terminals, i.e. that it is possible to implement carriers where legacy communication terminals may be scheduled in all parts of the wideband LTE Rel-10 carrier. The straightforward way to obtain this would be by means of Carrier Aggregation (CA). CA implies that an LTE Rel-10 communication terminal may receive multiple CC, where the CC have, or at least has the possibility to have, the same structure as a Rel-8 carrier. CA is illustrated in FIG. 4.

The number of aggregated CC as well as the bandwidth of the individual CC may be different for uplink and downlink. A symmetric configuration refers to the case where the number of CCs in downlink and uplink is the same whereas an asymmetric configuration refers to the case where the number of CCs is different between UL and DL. It is important to note that the number of CCs configured in a cell may be different from the number of CCs seen by a communication terminal. For example, a communication terminal may support more downlink CCs than uplink CCs, even though the cell is configured with the same number of uplink and downlink CCs.

Scheduling of a CC is done on the PDCCH or EPDCCH via downlink assignments. Control information on the PDCCH/EPDCCH is formatted as a Downlink Control Information (DCI) message. In Rel-8 a communication terminal only operates with one DL and one UL CC. The association between DL assignment, UL grants and the corresponding DL and UL CCs is therefore clear. In Rel-10 two modes of CA needs to be distinguished. A first case is very similar to the operation of multiple Rel-8 communication terminals, a DL assignment or UL grant contained in a DCI message transmitted on a CC is either valid for the DL CC itself or for an associated, either via cell-specific or communication terminal specific linking, UL CC. A second mode of operation, denoted cross-carrier scheduling, augments a DCI message with a Carrier Indicator Field (CIF). A DCI message containing a DL assignment with CIF is valid for the indicated DL CC and a DCI message containing an UL grant with CIF is valid for the indicated UL CC. The DCI message transmitted using EPDCCH which was introduced in Rel-11 can also carry CIF which means that cross-carrier scheduling is supported also when using EPDCCH.

In typical deployments of WLAN, Carrier Sense Multiple Access with Collision Avoidance (CSMA/CA) is used. This means that the channel is sensed, and only if the channel is declared as Idle, a transmission is initiated. In case the channel is declared as Busy, the transmission is essentially deferred until the channel is found Idle. When the range of several radio access nodes using the same frequency overlap, this means that all transmissions related to one radio access node might be deferred in case a transmission on the same frequency to or from another radio access node which is within range can be detected. Effectively, this means that if several radio access nodes are within range, they will have to share the channel in time, and the throughput for the individual radio access nodes may be severely degraded. A general illustration of the LBT mechanism is shown in FIG. 5. During a first time interval $T_1$ the radio access node performs Clear Channel Assessment (CCA) using energy detection of a wireless channel. Traffic is not detected during the first time interval $T_1$, $T_1 \geq 20$ μs. The radio access node then occupies the wireless channel and starts data transmission over a second time interval $T_2$. The second time interval may be in the range of 1 ms to 10 ms. The radio access node may then send control (CTRL) signals without performing a CCA check over a fifth time interval $T_5$ because the channel has already been occupied by the radio access node for the data transmission. Then during a time period $T_3$ of length $\geq 0.05 T_2$, the radio access node remains idle, meaning that the radio access node does not transmit on the wireless channel. At the end of the Idle period, the radio access node performs CCA and detects that the channel is being used for other traffic. Then during a fourth time interval $T_4$ being defined as $T_2 + T_3$ the radio access node is prohibited to transmit on the wireless channel, as it was found to be occupied by other traffic. The radio access node starts a CCA at the end of the prohibited time $T_4$. The radio access node performs CCA using energy detection at the end of the fourth time interval $T_4$. As the CCA indicates that the wireless channel is free, the radio access node may occupy the channel and start a data transmission.

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, discussions are ongoing in 3GPP to initiate a new study item on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects that the channel is occupied.

Furthermore, one way to utilize the unlicensed spectrum reliably is to transmit essential control signals and channels on a licensed carrier. That is, as shown in FIG. 6, a communication terminal is connected to a PCell in the licensed band or spectrum and one or more SCells in the unlicensed band or spectrum. A secondary cell in unlicensed spectrum is herein denoted as license assisted secondary cell (LA SCell).

Prior to occupying a channel in an unlicensed band, the network needs to check the availability of the channel by means of LBT. When the network has already accessed a channel, it may, in the following and adjacent transmission time interval, start transmission immediately, e.g. from symbol 0, without performing LBT.

Herein it is assumed that control information to the communication terminal is transmitted on a carrier where LBT does not need to be used, but that data transmissions to the communication terminal are scheduled on the carrier where LBT needs to be used. This is denoted cross-carrier scheduling. Whether LBT is used in a subframe is a network, or radio access node, decision. It is thus a problem how the communication terminal will know whether the radio access node is performing LBT or not, since it impacts the mapping of EPDCCH and PDSCH modulated symbols to resource elements. When LBT is performed, the network cannot transmit, and if the channel is unoccupied, the data transmission can start only after the LBT period. When LBT is not performed, transmission may, as mentioned above, start immediately in the following and adjacent transmission time interval or subframe. Hence, the starting OFDM symbol for data is different depending on whether LBT is performed or not. If the starting OFDM symbol is unknown at the communication terminal, the communication terminal is unable to receive messages. This will lead to a limited performance of the wireless communications network.

SUMMARY

An object of embodiments herein is to provide a mechanism that improves the performance of the wireless communications network when implementing usage of a telecommunication technology into an unlicensed spectrum e.g. where LBT is used.

The object is achieved by providing a method performed by a communication terminal for handling communication, which communication terminal is being served by a radio access node in a first cell on a carrier of a licensed frequency spectrum and cross-carrier scheduled in a second cell on a carrier of an unlicensed frequency spectrum by the radio access node via the first cell. The communication terminal receives an indication that data may be scheduled for the communication terminal on a data channel in the second cell. The communication terminal attempts to detect presence of the data channel intended for the communication terminal. In case the communication terminal detects presence of the data channel intended for the communication terminal, the communication terminal decodes the data channel; and in case the communication terminal does not detect presence of the data channel intended for the communication terminal, the communication terminal indicates a non-detection of the data channel to the radio access node.

The object is achieved by providing a method performed by a radio access node for handling communication with a communication terminal in a second cell on a carrier of an unlicensed frequency spectrum, wherein resources for communication with the communication terminal in the second cell are cross-carrier scheduled from a first cell on a carrier of a licensed frequency spectrum. The radio access node transmits an indication that data may be scheduled for the communication terminal on a data channel in the second cell.

The object is further achieved by providing a communication terminal for handling communication, which communication terminal is configured to communicate with a radio access node in a first cell on a carrier of a licensed frequency spectrum and to be cross-carrier scheduled in a second cell on a carrier of an unlicensed frequency spectrum by the radio access node via the first cell. The communication terminal is configured to receive an indication that data may be scheduled for the communication terminal on a data channel in the second cell. The communication terminal is further configured to attempt to detect presence of the data channel intended for the communication terminal. In case the communication terminal detects presence of the data channel intended for the communication terminal, the communication terminal is configured to decode the data channel, and in case the communication terminal does not detect presence of the data channel intended for the communication terminal, the communication terminal is configured to indicate a non-detection of the data channel to the radio access node.

The object is further achieved by providing a radio access node for handling communication with a communication terminal, the radio access node being configured to communicate with the communication terminal in a second cell on a carrier of an unlicensed frequency spectrum, wherein resources for communication with the communication terminal in the second cell are cross-carrier scheduled from a first cell on a carrier of a licensed frequency spectrum. The radio access node is configured to transmit an indication that data may be scheduled for the communication terminal on a data channel in the second cell.

By attempting to detect presence of the data channel the communication terminal will be able to more reliably receive data transmitted on the second cell also when the transmission is deferred due to that LBT must be performed before the transmission can be made. Thereby the performance of the wireless communication network is improved.

BRIEF DESCRIPTION OF THE DRAWINGS

Embodiments will now be described in more detail in relation to the enclosed drawings, in which:

FIG. 1 is a schematic overview depicting an LTE downlink physical resource.

FIG. 2 is a schematic overview depicting an LTE frame structure.

DETAILED DESCRIPTION

Figure 3:
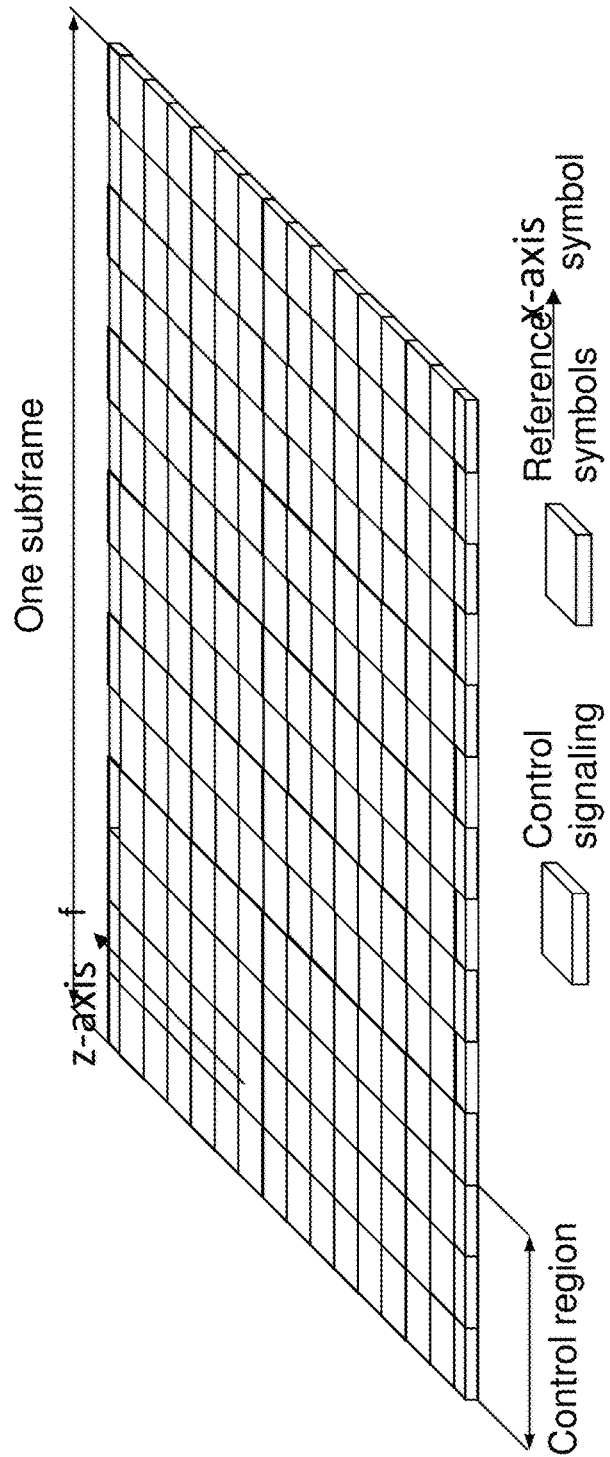
FIG. 3 is a schematic overview depicting a downlink subframe in LTE.
Figure 4:
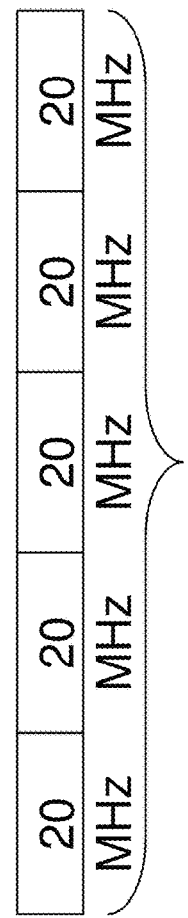
FIG. 4 is a schematic overview depicting a bandwidth of a carrier aggregation.
Figure 5:
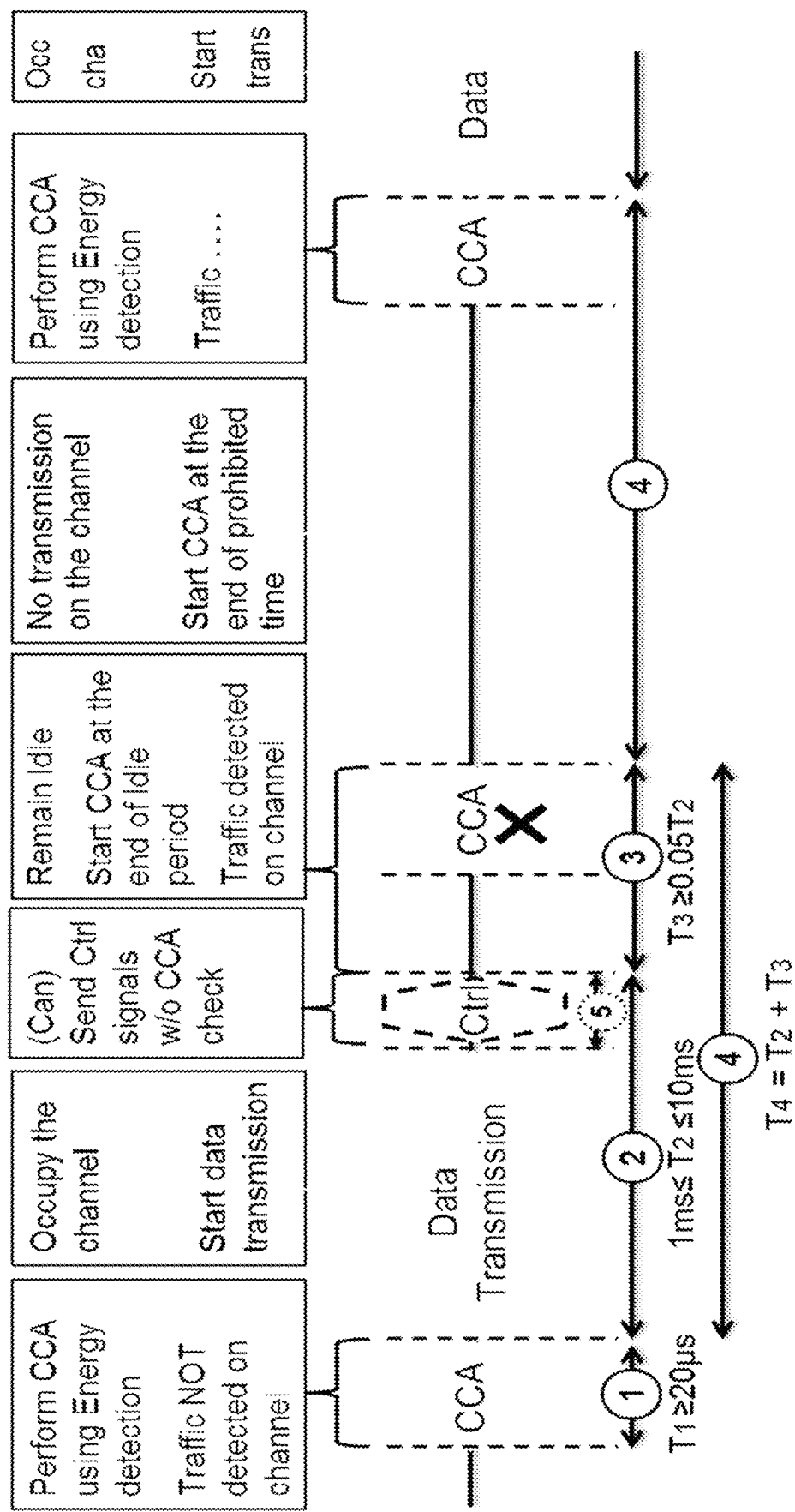
FIG. 5 is a schematic illustration illustrating a LBT process or method.
Figure 6:
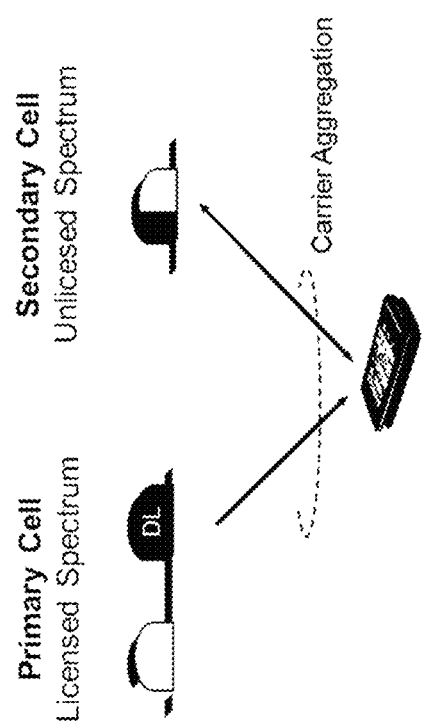
FIG. 6 is a schematic overview depicting a License-assisted Access (LAA) to an unlicensed frequency spectrum using LTE carrier aggregation.
Figure 7A:
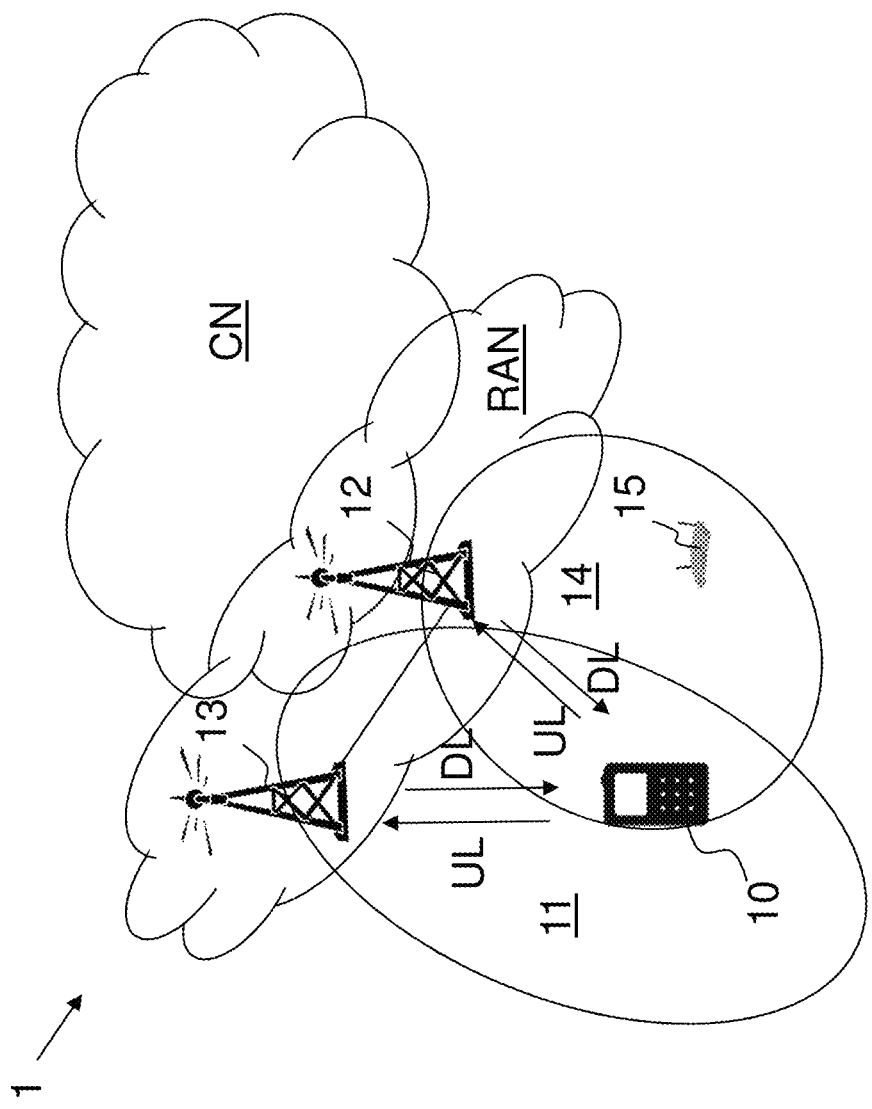
FIG. 7a is a schematic overview depicting a wireless communication network according to embodiments herein.

Embodiments herein relate to wireless communication networks in general. FIG. 7a is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a communication terminal 10, also known as a wireless device, a user equipment and/or a wireless terminal, communicates via a Radio Access Network (RAN) to one or more core networks (CN). It should be understood by the skilled in the art that "communication terminal" is a non-limiting term which means any wireless terminal, user equipment, Machine Type Communication (MTC) device, a Device to Device (D2D) terminal, or node e.g. smartphone, laptop, mobile, sensor, relay, mobile tablets or even a small base station communicating within a cell.

Communication terminals connect in a licensed spectrum, to a first cell 11 e.g. a Primary Cell (PCell), and use carrier aggregation to benefit from additional transmission capacity in an unlicensed spectrum, whereby they connect to a second cell 14 e.g. a Secondary Cell (SCell) also referred to as Licensed Assisted (LA) SCell. To reduce the changes required for aggregating licensed and unlicensed spectrum, a frame timing in the first cell 11 is simultaneously used in the second cell 14.

The wireless communication network 1 covers a geographical area which is divided into cell areas, e.g. the first cell 11 and the second cell 14. The second cell 14 is served by a second radio access node 12 providing radio coverage over the second cell 14. The first cell 11 may also be served by the second radio access node 12 but in the illustrated examples herein the first cell 11 is being served by a first radio access node 13. The radio access nodes may be radio base stations such as NodeBs, evolved Node Bs (eNB, eNode B), Wi-Fi access point base transceiver stations, Access Point Base Stations, base station routers, or any other network units capable of communicating with a communication terminal within the cell served by the respective radio access node depending e.g. on the radio access technology and terminology used. The radio access nodes may serve one or more cells. A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but use different frequency bands.

The radio access nodes communicate over the air or radio interface operating on radio frequencies with the communication terminal 10 within range of the respective radio access node. The communication terminal 10 transmits data over the radio interface to the respective radio access node in Uplink (UL) transmissions and the respective radio access node transmits data over an air or radio interface to the communication terminal 10 in Downlink (DL) transmissions.

The second radio access node 12 serving the second cell 14 uses a carrier of an unlicensed frequency spectrum, which unlicensed frequency spectrum may also be used by an access point 15 such as a WiFi modem, a hotspot or similar. Since the unlicensed frequency spectrum must be shared with other communication terminals or radio access node, potentially operating according to other radio standards such as IEEE 802.11n, of similar or dissimilar wireless technologies, a so called Listen-Before-Talk (LBT) method may need to be applied. Thus, the second radio access node 12 may use an LBT process before transmitting to the communication terminal 10. In embodiments herein cross-carrier scheduling is performed wherein data channels such as PDSCH and PUSCH are cross-carrier scheduled. Hence, a control channel such as the EPDCCH or PDCCH transmitted on the first cell 11 schedules the data to be transmitted on the second cell 14 in a cross-carrier manner. Embodiments herein describe how to enable the communication terminal 10 to detect the PDSCH e.g. blindly or automatically and how to inform the radio access node, such as the first radio access node 13, that the communication terminal 10 has detected or not detected the PDSCH.

The problem of mismatch between radio access node and communication terminal in transmission time due to LBT is solved by the communication terminal detecting presence of the PDSCH. The detection may be made autonomously by the communication terminal. Further a set of communication terminal and radio access node behaviors if the communication terminal detects the presence of the PDSCH are specified herein. Embodiments herein describe how to enable the communication terminal to detect the PDSCH and how to inform the radio access node that the communication terminal has detected the PDSCH.

The following advantages have been identified of some embodiments herein:

- A radio access node actively chooses whether or not to schedule data transmission to the communication terminal by performing LBT after the PDCCH has been transmitted. This allows use of cross-carrier scheduling by PDCCH on one carrier together with LBT on another carrier.
- The communication terminal 10 may adjust the time interval where the communication terminal 10 can expect signals such as control or data channels accordingly. This increases the reliability of successful reception.
- LBT on an unlicensed carrier may result in deciding not to transmit an PDSCH although this has been scheduled by the first radio access node 13. This results in that the second radio access node 12 will perform LBT and if the channel on the unlicensed carrier, i. e. the channel on the carrier of the unlicensed frequency spectrum, is considered or determined to be free the second radio access node 12 will transmit a PDSCH to the communication terminal 10 according to the previously sent DL assignment on the first cell 11. The communication terminal 10 may blindly detect presence of the PDSCH on the second cell 14 and based on if the communication terminal detects it or not the communication terminal 10 tries to decode it. Further based on detection of presence of the PDSCH or not on the second cell 14, the communication terminal may indicate different HARQ feedback states on the first cell 11, or to the first radio access node 13.

Figure 7B:
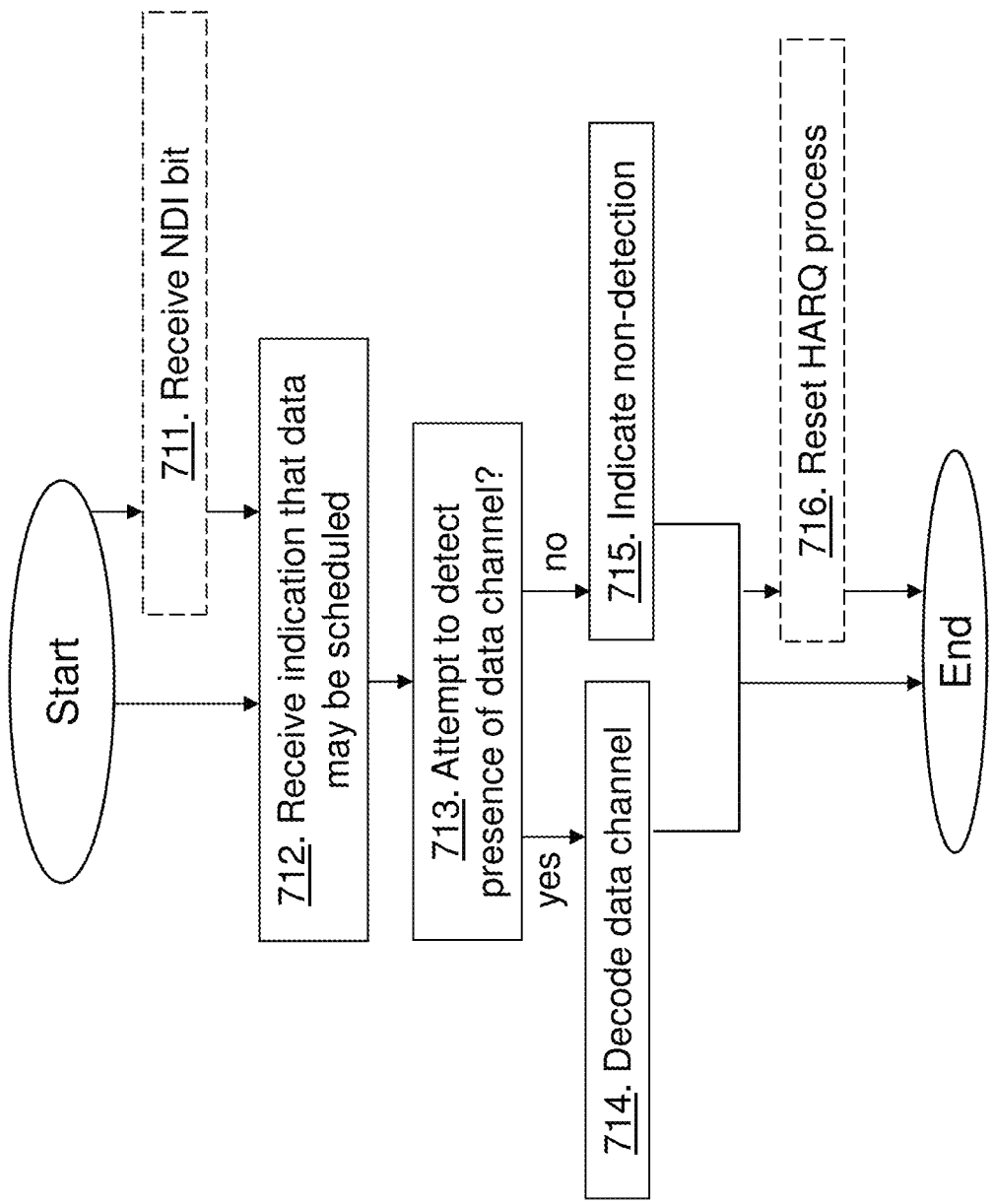
FIG. 7b is a flowchart of a method performed in a communication terminal according to embodiments herein

FIG. 7b is a schematic flowchart depicting the method performed by the communication terminal 10 for handling communication, which communication terminal 10 is being served by a radio access node of the wireless communication network, such as the first radio access node 13 or second radio access node 12, in the first cell 11 on a carrier of the licensed frequency spectrum and cross-carrier scheduled in the second cell 14 on a carrier of the unlicensed frequency spectrum by the radio access node via the first cell 11. The method may for example be used for handling communication with one or more radio access nodes on one or more carriers of the unlicensed frequency spectrum within the wireless communication network 1.

Action 711. The communication terminal 10 may in some embodiments receive on the first cell, a New Data Indicator, NDI, bit. The NDI bit may indicate how to indicate that the communication terminal 10 has received the scheduling DCI message but not received the data channel associated with the scheduling DCI message.

Action 712. The communication terminal 10 receives an indication that data may be scheduled for the communication terminal 10 on a data channel in the second cell 14. For example, the communication terminal 10 may receive a reference signal on the second cell 14 that indicates to the communication terminal 10 that the carrier of the unlicensed frequency spectrum has been occupied by the second cell 14. The reference signal may in some embodiments further indicate to the communication terminal 10 whether the data channel is present in a subframe or not. In one alternative, the reference signal may be common for all communication terminals operating on the second cell 14. In another alternative, the reference signal may be specific to the communication terminal 10. In this case the reference signal may be located within the data channel.

Alternatively or additionally, the communication terminal 10 may receive, on the first cell 11, control information for the second cell 14. The control information indicates where in a subframe the data channel is scheduled in the second cell 14 for the communication terminal 10.

Action 713. The communication terminal 10 attempts to detect presence of the data channel intended for the communication terminal 10. The communication terminal 10 may in some embodiments attempt to detect the data channel in the subframe as indicated by the control information received on the first cell 11 in Action 712. Alternatively or additionally, the communication terminal 10 may attempt to detect the data channel in a subframe as indicated by the reference signal received on the second cell in Action 712. In other words, the communication terminal 10 may attempt to detect the data channel in the subframe comprising the control information and/or in a separate subframe that may follow after the subframe comprising the control information. In some embodiments the communication terminal 10 may detect, or attempt to detect, presence of the data channel blindly. In some embodiments, the communication terminal 10 may attempt to detect presence of the data channel by correlating received reference signal sequences with a set of known sequences, and when the correlation is above a threshold for matching, the presence of the data channel intended for the communication terminal 10 is considered detected.

In some embodiments, where the data on the data channel may be scheduled with a Demodulation Reference Signal, DMRS, based transmission scheme, the communication terminal 10 may attempt to detect the data channel by searching for a DMRS on scheduled Physical Resource Blocks, PRBs. Based on an outcome of the search, the communication terminal 10 may judge whether or not the data channel intended for the communication terminal 10 is scheduled in the PRBs. In further embodiments, where the data on the data channel may be scheduled with a Cell Specific Reference Signal (CRS) based transmission scheme, the communication terminal 10 may attempt to detect the data channel by validating allocated Physical Resource Blocks, PRBs. If the allocated PRBs are consistent with the information given in a scheduling DCI message, the communication terminal 10 determines the data channel to be detected, and if the allocated PRBs are not consistent with the information given in the scheduling DCI message, the communication terminal 10 determines the data channel not to be present.

Action 714. In case the communication terminal 10 detects presence of the data channel intended for the communication terminal 10, the communication terminal 10 decodes the data channel.

Action 715. In case the communication terminal 10 does not detect presence of the data channel intended for the communication terminal 10, the communication terminal 10 indicates a non-detection of the data channel to the radio access node 12, 13. The communication terminal 10 may indicate a non-detection by transmitting a Non-Acknowledgement, NACK, or Discontinuous Transmission, DTX, state, on the first cell 11. The communication terminal 10 may further indicate a non-detection of the data channel by indicating on the first cell 11 that the communication terminal 10 has received a scheduling DCI message but not received the data channel associated with the scheduling DCI message.

Action 716. The communication terminal 10 may reset an hybrid automatic request process when the data channel is detected and corresponds to information in the scheduling DCI message; or independently of whether the data channel is detected or not.

Figure 7C:
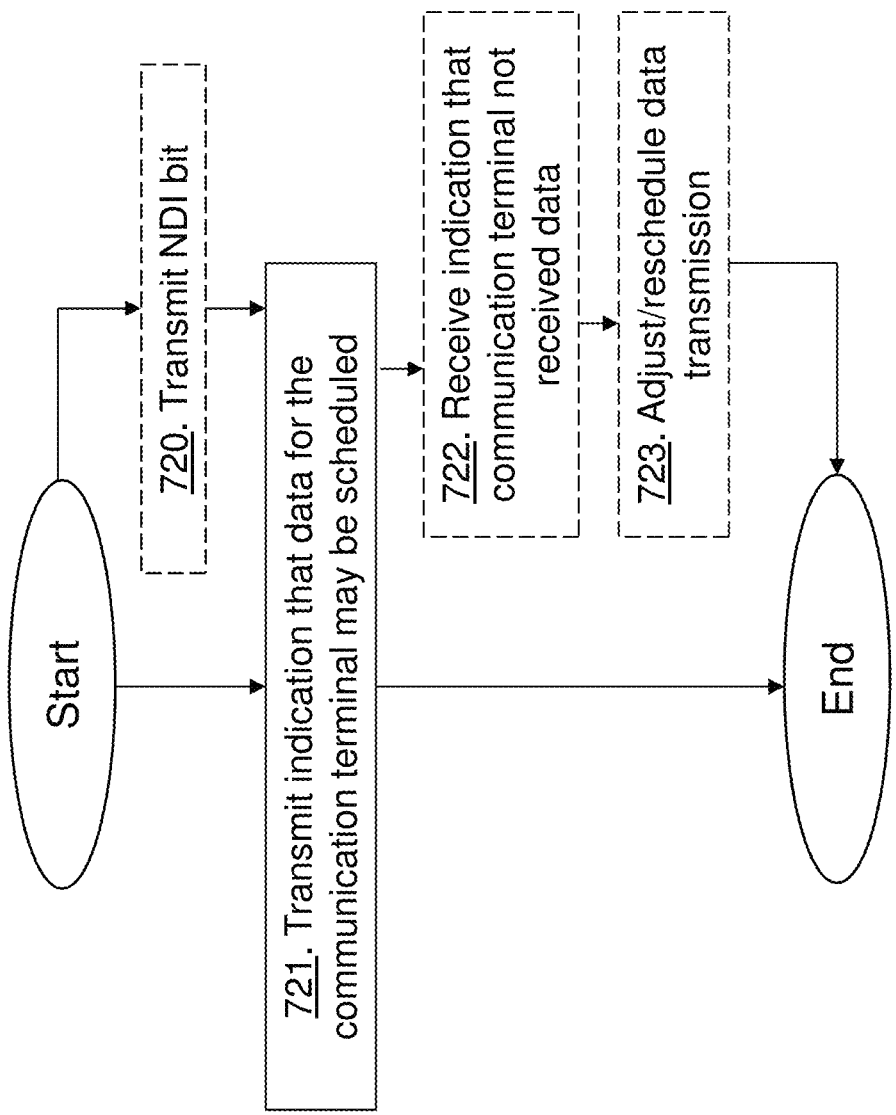
FIG. 7c is a flowchart of a method performed in a radio access node according to embodiments herein.

FIG. 7c is a schematic flowchart depicting the method performed by the radio access node such as the first radio access node 13 or the second radio access node 12 for handling communication with the communication terminal 10 in the second cell 14 on a carrier of the unlicensed frequency spectrum, wherein resources for communication with the communication terminal 10 in the second cell 14 are cross-carrier scheduled from the first cell 11 on a carrier of the licensed frequency spectrum. The method may for example be used for handling communication with the communication terminal on one or more carriers of the unlicensed frequency spectrum within the wireless communication network 1.

Action 720. The radio access node may transmit to the communication terminal 10 on the first cell 11, the NDI bit, which NDI bit indicates how to indicate that the communication terminal 10 has received the scheduling DCI message but not received the data channel associated to the scheduling DCI message.

Action 721. The radio access node transmits the indication that data may be scheduled for the communication terminal 10 on a data channel in the second cell 14. In some embodiments, wherein the radio access node is configured to serve the communication terminal 10 in the second cell 14 on the carrier of the unlicensed frequency spectrum, e.g. being the second radio access node 12, the radio access node may transmit the indication that data may be scheduled for the communication terminal 10 by transmitting a reference signal on the second cell 14 that indicates to the communication terminal 10 that the carrier of the unlicensed frequency spectrum has been occupied by the second cell 14. The reference signal may in some embodiments further indicate to the communication terminal 10 whether the data channel is present in a subframe transmitted on the second cell 14 or not. In one alternative, the reference signal may be common for all communication terminals operating on the second cell 14. In another alternative, the reference signal may be specific to the communication terminal 10. In this case the reference signal may be located within the data channel.

In some embodiments, where the data on the data channel may be scheduled with a DMRS based transmission scheme, the radio access node may transmit the indication that data may be scheduled for the communication terminal 10 by transmitting, on scheduled PRBs, a DMRS with a modified pattern that indicates presence of the data channel to the communication terminal 10. In further embodiments, the radio access node may transmit the indication that data may be scheduled for the communication terminal 10 by transmitting an extra detection RS on the second cell 14 when the carrier of the unlicensed frequency spectrum is occupied by the second cell 14, and wherein the extra detection RS is changes form or state to indicate to the communication terminal 10 that the data channel is present.

Furthermore, the radio access node may perform a Listen Before Talk (LBT) process on the carrier of the unlicensed spectrum before transmitting, on the second cell 14, any indication that data may be scheduled for the communication terminal 10, and transmitting the indication only when the outcome of the LBT process is that the carrier of the unlicensed frequency spectrum is free.

In some embodiments the radio access node is configured to serve the communication terminal 10 in the first cell 11 and to cross-carrier schedule resources for the communication terminal 10 in the second cell 14 via the first cell 11. The radio access node may then, alternatively of additionally, transmit the indication that data may be scheduled for the communication terminal 10 by transmitting, on the first cell 11, control information for the second cell 14 to the communication terminal 10, which control information indicates where in a subframe the data channel is scheduled in the second cell 14 for the communication terminal 10.

Action 722. In embodiments where the radio access node is configured to serve the communication terminal 10 in the first cell 11 and to cross-carrier schedule resources for the communication terminal 10 in the second cell 14, the radio access node may then receive an indication that the communication terminal 10 has not received the data on the data channel scheduled in the second cell 14. The indication may in one example be received on the first cell 11. The received indication may be a NACK or DTX response from the communication terminal 10 or that the radio access node does not detect any Hybrid Automatic Repeat Request, HARQ, response, for example on the first cell 11, from the communication terminal 10 although the data channel has been transmitted to the communication terminal 10 on the second cell 14. The received indication may further indicate that the communication terminal 10 has received a scheduling DCI message but not received the data channel associated to the scheduling DCI message.

Action 723. The radio access node may further reschedule the data on the data channel, or adjust the data channel, based on the received indication. For example, the radio access node may schedule a same redundancy version for re-transmission as used for transmission of the data in order to improve reception of a transport block in the communication terminal 10 in that the transport block is repeatedly transmitted until confirmed received.

Figure 8:
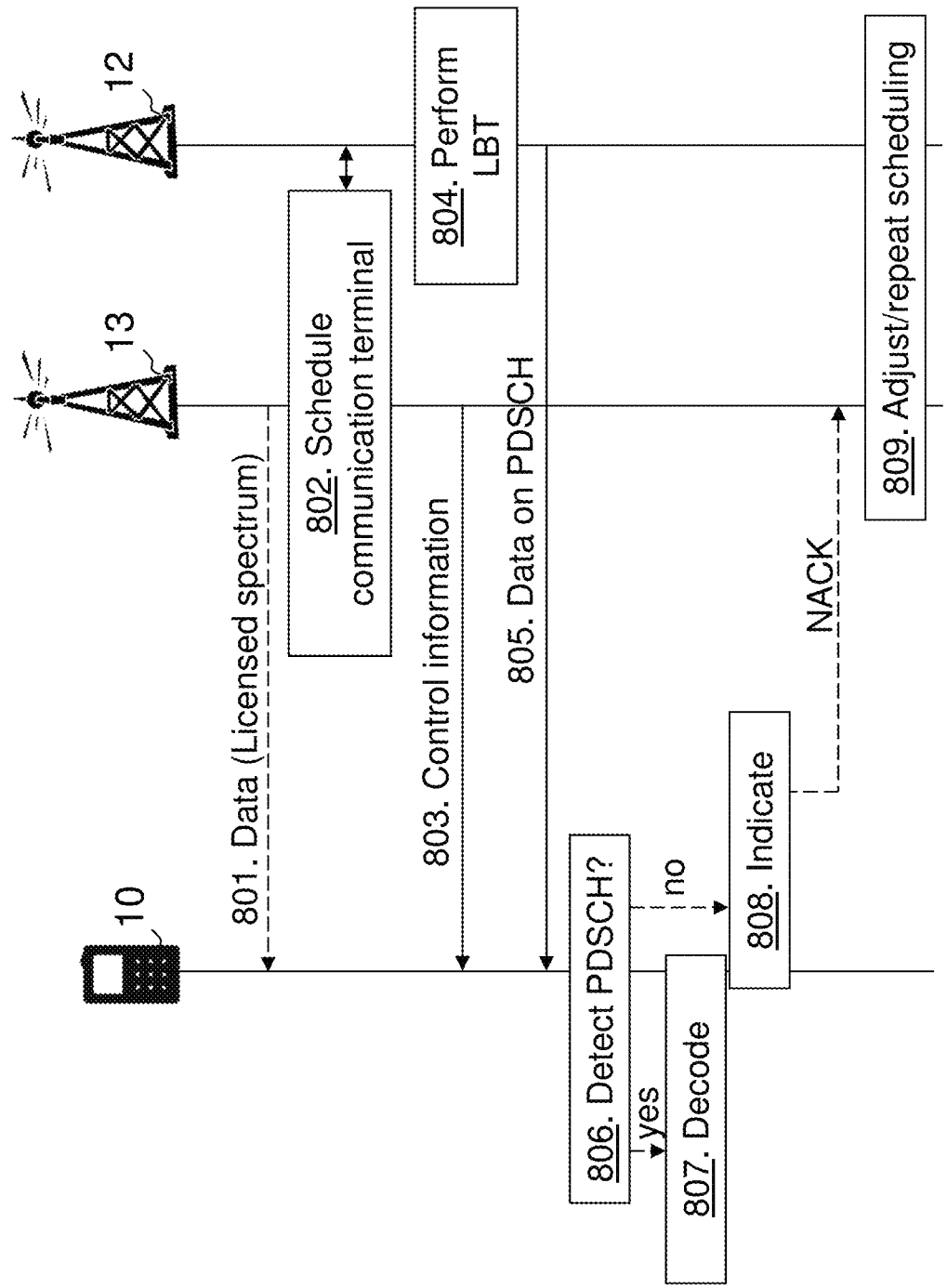
FIG. 8 is a combined flowchart and signalling scheme according to embodiments herein.

FIG. 8 is a combined flowchart and signaling scheme according to exemplified embodiments herein, wherein the first radio access node 13 performs cross carrier scheduling for the radio access node 12.

Action 801. The first radio access node 13 serving the first cell 11, such as a PCell, transmits data and/or scheduling information, e.g. DCI, regarding the first cell 11 to the communication terminal 10. It should be noted that the first radio access node 13 may transmit scheduling information regarding or concerning the second cell 14 to the communication terminal 10 e.g. when performing cross carrier scheduling as stated in actions 802 and 803 below.

Action 802. The first radio access node 13 schedules the communication terminal 10 with control information using PDCCH. The first radio access node 13 or a scheduler in the first radio access node 13 may also take into account which PDSCH resources that are available in the second cell 14. So the scheduler in the first radio access node 13 may have knowledge also about decisions made by a scheduler operating in the second radio access node 12. For instance, there could be a scheduler in the second radio access node 12 scheduling communication terminals supporting EPDCCH, i.e. terminals that do not need to be cross-carrier scheduled for PDSCH, but also scheduling communication terminals for data transmissions, PDSCH, not supporting EPDCCH that must be cross-carrier scheduled with control information, PDCCH, from first radio access node 13. Thus, the first radio access node 13 or the scheduler in the first radio access node 13 may be cooperating with the second radio access node 12 or a scheduler in the second radio access node 12, or there may be a joint scheduler. The scheduling information of the PDSCH may be obtained from the second radio access node 12 as indicated by the double directed arrow.

Action 803. The first radio access node 13 transmits control information such as DCI to the communication terminal 10 as scheduled.

The first radio access node 13 schedules the communication terminal 10 with PDCCH in a cross-carrier manner before knowing whether the channel on the Scell, i.e. on the second cell 14 is free or not. Note that the transmission of this control information or scheduling message performed in action 803 may take place simultaneously as the LBT is performed by the second radio access node 12, action 804 below. The first radio access node 13 may in some embodiments schedule the communication terminal 10 with multiple different DL assignments such that the DL assignments may have different starting OFDM symbols. The communication terminal 10 may then in one example make one attempt to detect PDSCH per starting OFDM symbol candidate. Depending on when the second radio access node 12 detects the channel to be free one of the DL assignments having a suitable starting OFDM symbol may then be applicable. A PQI indicator in the DCI message indicates a starting OFDM symbol for the mapping of the PDSCH that is located after LBT has been performed on the unlicensed carrier, i.e. the second cell 14. It may further be so that there are multiple PQI indicators in the same DL assignment, i.e. indicating multiple starting OFDM symbols to the communication terminal 10. The following single PDSCH that is sent to the communication terminal 10 can only be sent if the channel on the carrier is considered or determined to be free.

Action 804. The second radio access node 12 performs a LBT process and listens to the carrier of the unlicensed frequency spectrum. The second radio access node 12 will determine if the channel is free based on LBT on that carrier. In case it is not free, the PDSCH cannot be transmitted, despite the fact that the scheduling message has already been transmitted to the communication terminal 10. However there are several options for how to indicate to the communication terminal 10 whether there is actually any PDSCH located there or not. Some options for such indications are further outlined below.

Action 805. The second radio access node 12 may transmit data on the PDSCH in case the channel is free.

Action 806. According to embodiments herein, the communication terminal 10 tries to blindly detect the presence of PDSCH intended for the communication terminal 10.

Action 807. According to embodiments herein, the communication terminal 10 detects the presence of PDSCH intended for the communication terminal 10 and then decodes the PDSCH.

For data scheduled with Demodulation Reference Signal (DMRS) based transmission schemes, as available in for example TM10: The communication terminal 10 would be able to search for a DMRS on the scheduled Physical Resource Blocks (PRBs) and based on the outcome of detection judge whether or not the communication terminal 10 has been scheduled. The communication terminal 10 would then for example only search for the DMRS sequence on the assigned PRBs in the DCI message that it has received. In other words, the communication terminal may try to detect presence of the DMRS to detect the presence of PDSCH. If the communication terminal 10 detects the presence of a PDSCH the communication terminal 10 should according to one embodiment try to decode it. In an embodiment the communication terminal 10 may try to correlate a known DMRS sequence or sequences with detected soft values and if the correlation is high, e.g. above a threshold, the communication terminal 10 may consider the DMRS based on the DL assignment to be detected and the communication terminal 10 may then consider the PDSCH to be present.

For transmissions scheduled by CRS based transmission schemes or also for DMRS based transmission schemes where DMRS detection is not used; the communication terminal 10 may try to detect the PDSCH by validating the scheduled or allocated PRBs, meaning that if the scheduling corresponds to the information given in the scheduling DCI format, a.k.a. DCI message, e.g. the communication terminal verifies that a modulation order is consistent with what is signaled in the DCI message, and that the allocated PRBs are consistent with the content of the DCI message, the communication terminal 10 determines the PDSCH to be detected. If not the PDSCH is determined not to be present.

An alternative approach is that an extra detection Reference Signal (RS), a specific RS, is located somewhere on the unlicensed carrier, i.e. on the second cell 14.

This specific RS could be a signal located within the scheduled PDSCH. For example the RS could be a sequence and pattern that is a modification to the DMRS. Alternatively a new RS pattern is defined within the PDSCH, but it is specific per scheduled PDSCH.

A different approach is that a common RS is located in the unlicensed carrier that is common for all communication terminals operating on it and that the presence or state of the common RS would indicate whether the scheduled PDSCH is present there or not. This common RS may only be present if the channel is found to be free and by transmitting the common RS together with the PDSCH, the second radio base station 12 indicates to the communication terminal 10 that it has occupied the channel. Alternatively the common RS is always present but change some form of state if the scheduled PDSCH is there. For instance the scrambling code on the RS could change. The new scrambling code could be derived using a simple operation on the prior one such as a selective phase shift of some of the Resource Elements (RE) comprising the RS.

In a possible implementation in the communication terminal 10 of the above solution the communication terminal 10 may try to correlate the detected reference signals with a set of known sequences. The set of known sequences may be the different states of the specific RS possibly also including the RS sequence. The known sequences may be correlated with the detected or estimated soft values. If the correlation is high, e.g. above a threshold for matching, the communication terminal 10 considers or deems that it has detected the presence of the signal, i.e. of the PDSCH intended for the communication terminal 10, and would then continue with trying to decode the PDSCH.

Action 808. If the communication terminal 10 does not detect presence of the PDSCH in action 806, there are several different possible communication terminal behaviors for the communication terminal 10 to indicate that it has not detected the PDSCH.

1: The communication terminal 10 does not detect any PDSCH, e.g. because no PDSCH is transmitted or because of failed detection of PDCCH or EPDCCH, and thereby considers that the communication terminal 10 has not been scheduled on that HARQ process. The communication terminal 10 will not transmit any HARQ feedback to the network. If the first radio access node 13 does not detect any HARQ response from the communication terminal 10 although the second radio access node 12 has transmitted a PDSCH to the communication terminal 10 see action 802, the first radio access node 13 could then choose to schedule the same redundancy version again as the previously scheduled one to improve or optimize the reception of the transport block in the communication terminal 10 increasing the chance that the transport block will be received.

A different version of the same behavior is that the communication terminal 10 would indicate a Non-Acknowledgement (NACK), indicated with a dashed arrow in FIG. 8, as being one of many ways to indicate non reception, or Discontinuous Transmission (DTX) state to the radio access node, e.g. the first radio access node 13, for the scheduling data, i.e. PDCCH or EPDCCH. Depending on which HARQ-ACK reporting format the communication terminal 10 is configured with, the feedback can be defined differently or not depending on if NACK or DTX state is indicated. If the first radio access node 13 does detect an DTX/NACK response from the communication terminal 10 although the second radio access node 12 has transmitted a PDSCH to the communication terminal 10, the first radio access node 13 could then choose to schedule the same redundancy version again as the previously scheduled one to optimize the reception of the transport block in the communication terminal 10.

2: The communication terminal 10 does not detect any PDSCH and thereby considers that the communication terminal 10 has not been scheduled on that HARQ process. The communication terminal 10 will indicate to the network, e.g. to the first radio access node 13, that it has received the scheduling DCI message but not received the PDSCH associated to the DCI. This information can be used by the first radio access node 13 next time it schedules the communication terminal 10. If the first radio access node 13 does not detect any HARQ response from the communication terminal 10 although the second radio access node 12 has transmitted a PDSCH to the communication terminal 10, the first radio access node 13 could then choose to schedule the same redundancy version again as the previously scheduled one to optimize the reception of the transport block in the communication terminal 10.

Further if the first radio access node 13 indicates a New Data Indicator (NDI) bit in the scheduling DCI format or message, there are different possible communication terminal behaviors:

1. The communication terminal 10 resets the HARQ process independently of if any PDSCH is detected or not.
2. The communication terminal 10 resets the HARQ process only if a PDSCH is detected that corresponds to information in the scheduling DCI message. If a PDSCH is not detected, the communication terminal 10 does not reset the HARQ process. Resetting the HARQ process means that a soft buffer is reset at the communication terminal 10, i.e. all soft values are deleted to start over receiving a new transport block.

The HARQ feedback reported from the communication terminal 10 could also differ depending on if the NDI bit is flipped or toggled, i.e. '0' to '1' or '1' to '0' with respect to a previous received DCI message, or not. If the NDI bit is not flipped the communication terminal 10 could for example report either NACK or DTX or nothing for the specific HARQ process if no PDSCH is detected, whereas if the NDI bit is flipped, the communication terminal 10 may indicate to the network, e.g. to the first radio access node 13, that it has not detected a PDSCH corresponding to the scheduling DCI message. This would allow the first radio access node 13 to adapt scheduling of the HARQ process the next time it schedules a same process considering the fact that the communication terminal 10 has not received the first scheduled PDSCH message. This is mentioned in action 809 where the radio access node adjusts/repeats scheduling for the communication terminal 10.

Figure 9:
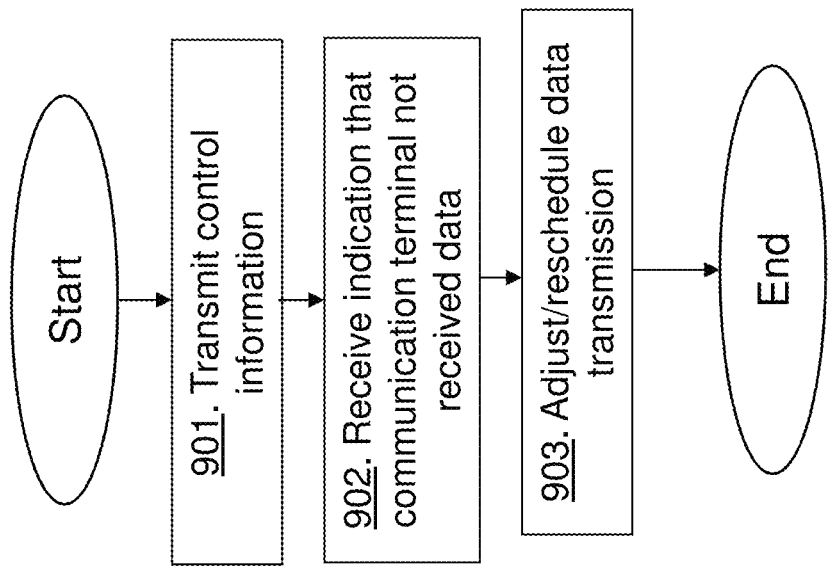
FIG. 9 is a flowchart of a method performed in a radio access node according to some embodiments herein.

FIG. 9 is a schematic flowchart depicting a method performed by a radio access node according to some embodiments herein. The radio access node, e.g. the first radio access node 13, being configured for cross-carrier scheduling of resources for the communication terminal in the second cell 14.

Action 901. The radio access node may transmit control information to the communication terminal, which control information indicates where data is scheduled in the second cell 14.

Action 902. The radio access node may receives the indication that the communication terminal has not received the data. E.g., the radio access node may receive a NACK from the communication terminal 10 or it may not receive any response from the communication terminal 10.

Action 903. The radio access node may then adjust or re-schedule the data transmission based on the received indication.

Figure 10:
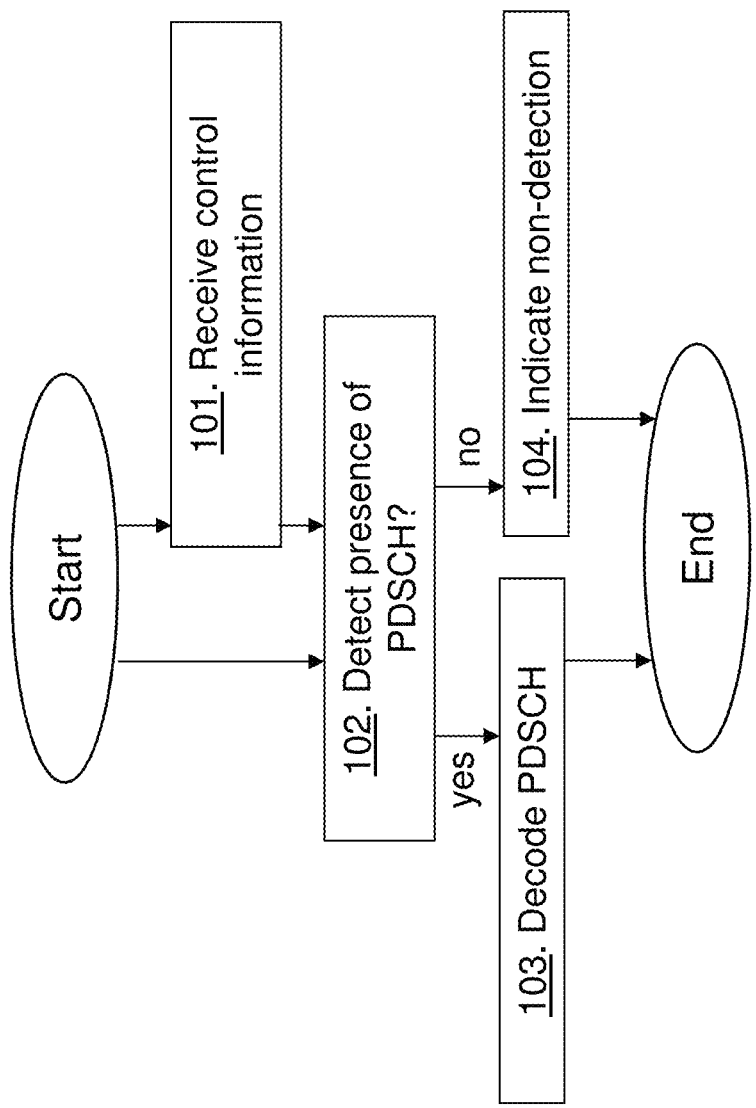
FIG. 10 is a flowchart of a method performed in a communication terminal according to some embodiments herein

FIG. 10 is a schematic flowchart depicting a method performed by the communication terminal 10 according to some embodiments herein. The communication terminal 10 is served by a radio access node, e.g. the first radio access node 13, in the first cell 11 of a licensed frequency spectrum and by a different radio access node, e.g. second radio access node 12, in the second cell 14 of an unlicensed frequency spectrum. The communication terminal 10 is scheduled in or on the second cell 14 by the radio access node serving the first cell 11, i.e. cross-carrier scheduled in the second cell 14 by the first radio access node 13.

Action 101. The communication terminal 10 may receive, from the first radio access node 13, control information, scheduling information or DCI of the second cell 14, which control information indicates where in a subframe data, PDSCH, is scheduled in the second cell 14.

Action 102. The communication terminal 10 detects, e.g. independently of the received control information, a presence of PDSCH, intended for the communication terminal 10 by comparing reference signals in a received transmission from the second radio access node 12. Thus, the communication terminal 10 may detect presence of the data channel leading to an improved performance of the wireless communication network 1.

Action 103. In case the communication terminal 10 detects presence of PDSCH intended for the communication terminal 10, the communication terminal 10 decodes the data channel such as PDSCH.

Action 104. In case control information indicates scheduling of PDSCH but the communication terminal 10 does not detect the presence of PDSCH intended for the communication terminal 10, the communication terminal 10 indicates a non-detection of PDSCH to e.g. the first radio access node 13.

Figure 11:
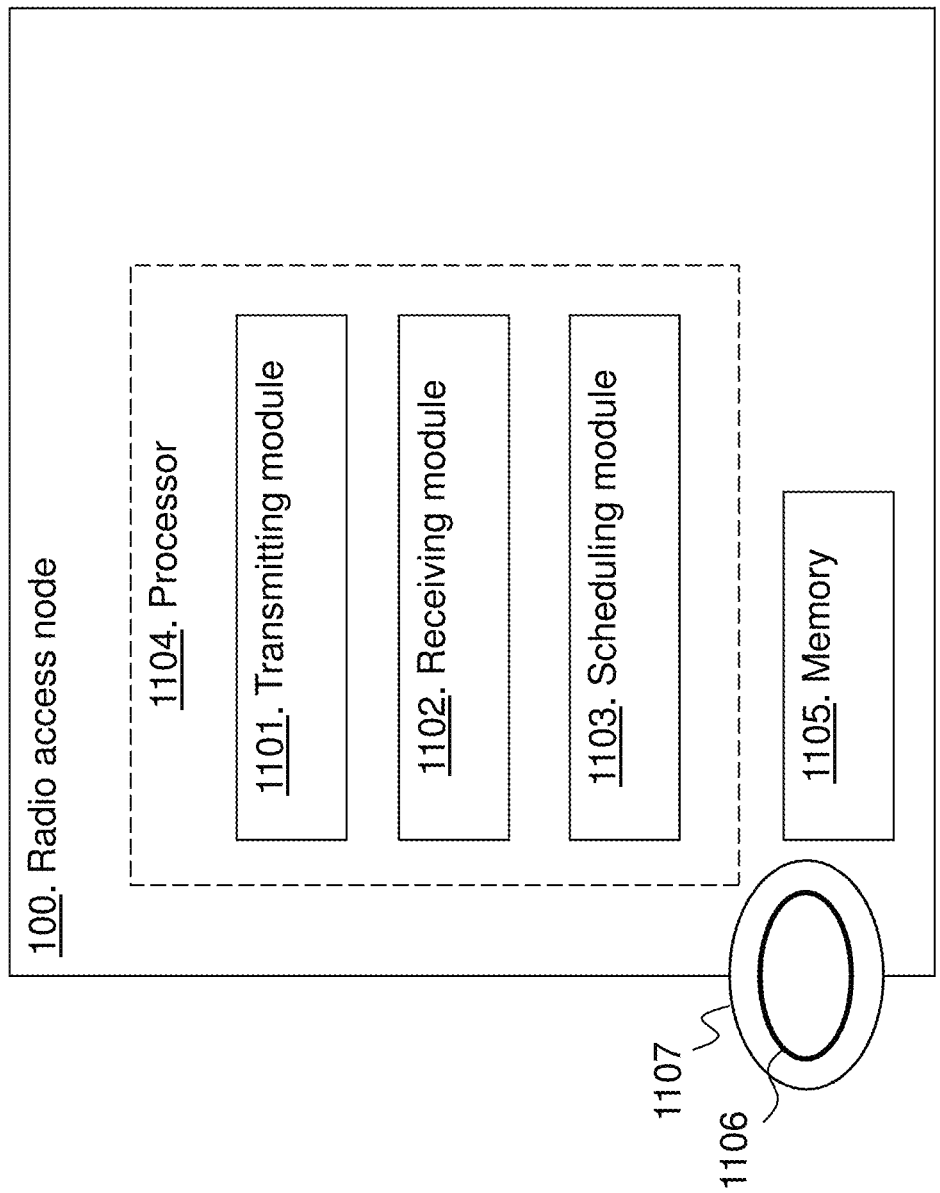
FIG. 11 is a block diagram depicting a radio access node according to embodiments herein.

In order to perform the methods herein a radio access node 100 is provided, exemplified above as the first radio access node 13. The description in the following is however equally applicable to the second radio access node 12. FIG. 11 is a block diagram depicting the radio access node 100 for handling communication with the communication terminal 10 according to embodiments herein. Handling herein means enabling communication and/or scheduling resources for communication for the communication terminal 10. The radio access node 100 is configured for cross-carrier scheduling of resources for the communication terminal 10 in the second cell 14.

The radio access node 100 for handling communication with the communication terminal 10 in the second cell on the carrier of the unlicensed frequency spectrum is herein provided. Resources for communication with the communication terminal (10) in the second cell (14) are cross carrier scheduled from the first cell on the carrier of the licensed frequency spectrum.

The radio access node 100 is configured to transmit the indication that data may be scheduled for the communication terminal 10 on the data channel in the second cell 14. The radio access node 100 may be configured to serve the communication terminal 10 in the second cell 14 of the unlicensed frequency spectrum. The radio access node 100 may then be configured to transmit the indication by being configured to transmit the reference signal on the second cell 14 that indicates to the communication terminal 10 that the carrier of the unlicensed frequency spectrum has been occupied by the second cell 14. The reference signal may in some embodiments further indicate to the communication terminal 10 whether the data channel is present in a subframe transmitted on the second cell 14 or not. In one alternative, the reference signal may be common for all communication terminals operating on the second cell 14. In another alternative, the reference signal may be specific to the communication terminal 10. In this case the reference signal may be located within the data channel.

Alternatively or additionally, the radio access node may be configured to serve the communication terminal 10 in the first and second cells 11, 14 and the radio access node may be configured to transmit the indication that data may be scheduled for the communication terminal 10 by being configured to transmit, on the first cell 11, control information for the second cell 14, which control information indicates where in a subframe the data channel is scheduled in the second cell 14 for the communication terminal 10.

The data channel may be scheduled with the DMRS based transmission scheme and the radio access node 100 may be configured to transmit the indication that data may be scheduled for the communication terminal 10 by being configured to transmit a DMRS with a modified pattern on scheduled PRBs that indicates presence of the data channel to the communication terminal 10. The radio access node 100 may further be configured to transmit the indication that data may be scheduled for the communication terminal 10 by being configured to transmit the extra detection RS on the second cell 14 when the carrier of the unlicensed frequency spectrum is occupied by the second cell 14. The extra detection RS may change form or state to indicate to the communication terminal 10 that the data channel is present in a subframe. The radio access node 100 may be further be configured to perform a Listen Before Talk, LBT, process on the carrier of the unlicensed spectrum and to transmit the indication only when the outcome of the LBT process is that the carrier of the unlicensed frequency spectrum is free.

In some embodiments the radio access node 100 is configured to serve the communication terminal 10 in the first cell 11 and to cross-carrier schedule resources for the communication terminal in the second cell 14 via the first cell 11. The radio access node may then be configured to transmit the indication by being configured to transmit control information to the communication terminal 10, which control information indicates where in a subframe the data channel is scheduled in the second cell 14 for the communication terminal 10.

The radio access node 100 may then be configured to receive an indication that the communication terminal 10 has not received the data channel scheduled in the second cell.

The radio access node may further be configured to reschedule the data channel based on the received indication. The received indication may be a NACK or DTX response from the communication terminal 10 or the received indication may be that the radio access node does to not detect any Hybrid Automatic Repeat Request, HARQ, response from the communication terminal 10 although the data channel is or has been transmitted on the second cell to the communication terminal 10. The received indication may indicate that the communication terminal 10 has received the scheduling DCI message but not received the data channel associated to the scheduling DCI message.

The radio access node may be configured to reschedule the data channel by being configured to schedule a same redundancy version for re-transmission as used for transmission of the data in order to improve or optimize a reception of a transport block in the communication terminal 10.

The radio access node may be configured to transmit on the first cell 11 to the communication terminal 10, the NDI bit, which NDI bit indicates how to indicate that the communication terminal 10 has received a scheduling DCI message but not received the data channel associated to the scheduling DCI message.

The radio access node may be configured to serve the communication terminal in the first and/or second cell. The radio access node may be the first radio access node 13 or the second radio access node 12, or a radio access node controlling the first and second cell.

The radio access node 100 is configured, e.g. by comprising a transmitting module 1101, to transmit the indication that data may be scheduled for the communication terminal 10 on the data channel in the second cell 14. Transmitting module 1101 may be configured to transmit the indication by being configured to transmit the reference signal on the second cell 14 that indicates to the communication terminal 10 that the carrier of the unlicensed frequency spectrum has been occupied by the second cell 14. The reference signal may in some embodiments further indicate to the communication terminal 10 whether the data channel is present in a subframe transmitted on the second cell 14 or not. In one alternative, the reference signal may be common for all communication terminals operating on the second cell 14. In another alternative, the reference signal may be specific to the communication terminal 10. In this case the reference signal may be located within the data channel.

Alternatively or additionally the transmitting module 1101 may be configured to transmit the indication by being configured to transmit, on the first cell 11, control information for the second cell 14 to the communication terminal 10, which control information indicates where data is scheduled, e.g. in a subframe, in the second cell 14. The transmitting module 1101 may be configured to transmit the indication that data may be scheduled for the communication terminal 10 as stated above. The transmitting module 1101 may be configured to transmit to the communication terminal 10, the NDI bit.

The radio access node 100 may further be configured, e.g. by comprising a receiving module 1102, to receive an indication that the communication terminal 10 has not received the data. E.g. the radio access node 100 may be configured to receive a NACK from the communication terminal 10 or to not receive any response from the communication terminal 10. The receiving module 1102 may be configured to receive the indication that the communication terminal has not received the data channel scheduled to communication terminal 10 as stated above.

The radio access node 100 may further be configured, e.g. by comprising a scheduling module 1103, to adjust or reschedule the data transmission based on the received indication. The scheduling module 1103 may be configured to reschedule the data channel based on the received indication as stated above. The scheduling module 1103 may be configured to reschedule the data channel by being configured to schedule a same redundancy version again as the previously scheduled data to optimize a reception of a transport block in the communication terminal 10.

The embodiments herein for handling communication may be implemented through one or more processors 1104 in the radio access node 100 depicted in FIG. 11, e.g. together with computer program code, which processor 1104 or processing means is configured to perform the functions and/or method actions of the embodiments herein.

The radio access node 100 further comprises a memory 1105. The memory comprises one or more units to be used to store data on, such as DCI information, LBT information, applications to perform the methods disclosed herein when being executed, and similar.

The methods according to the embodiments described herein for the radio access node 100 may be implemented by means of e.g. a computer program 1106 or a computer program product, comprising instructions, i.e., software code portions, which, when executed on at least one processor, cause the at least one processor to carry out the actions described herein, as performed by the radio access node 100. The computer program 1106 may be stored on a computer-readable storage medium 1107, e.g. a disc or similar. The computer-readable storage medium 1107, having stored thereon the computer program 1106, may comprise the instructions which, when executed on at least one processor, cause the at least one processor to carry out the actions described herein, as performed by the radio access node 100. In some embodiments, the computer-readable storage medium 1107 may be a non-transitory computer-readable storage medium.

Figure 12:
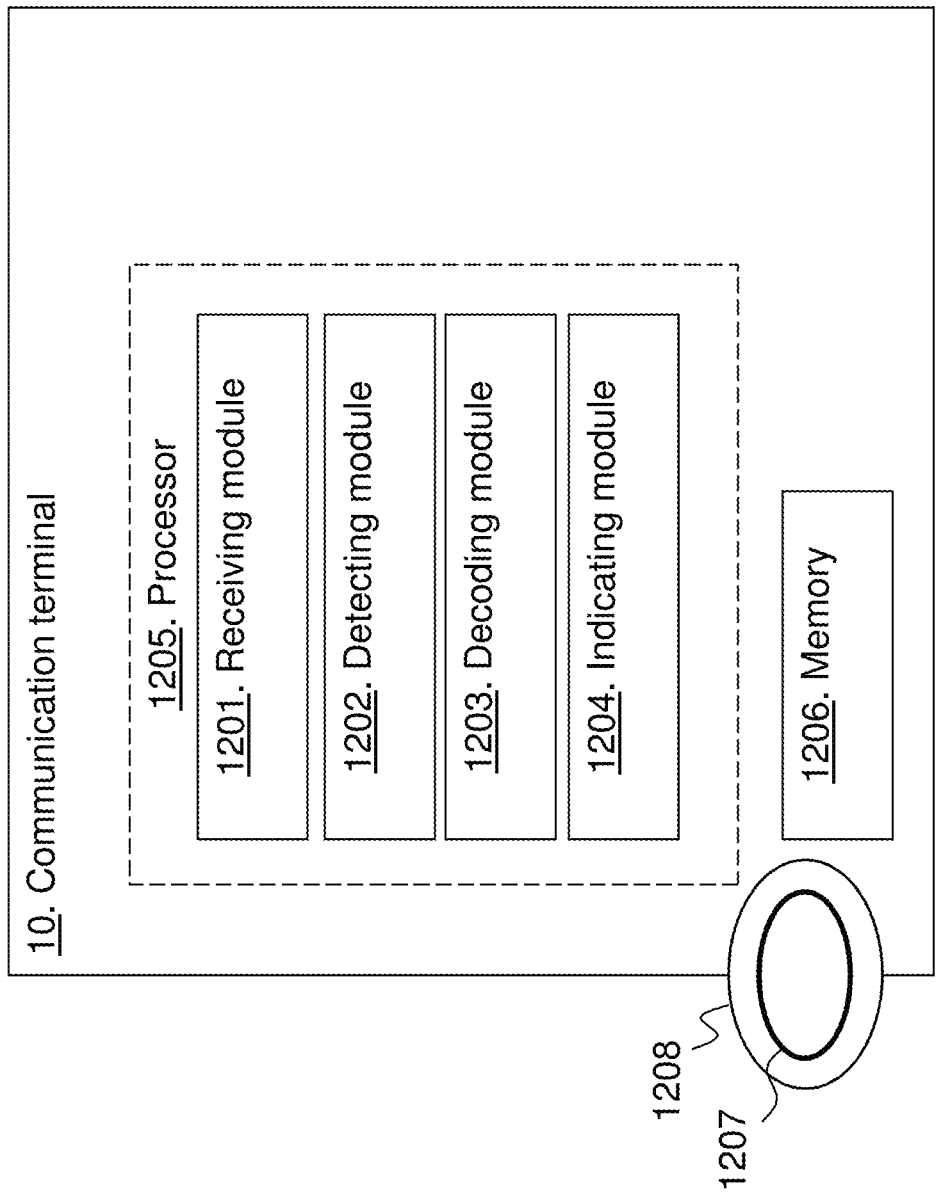
FIG. 12 is a block diagram depicting a communication terminal according to embodiments herein.

In order to perform some methods herein the communication terminal 10 for handling communication or communicating with the radio access node 100 is provided. Handling communication means communicating, enabling communication or processing scheduled resources. FIG. 12 is a block diagram depicting the communication terminal 10 according to embodiments herein. The communication terminal 10 is configured to be served by the radio access node 100, e.g. the first radio access node 13, in the first cell 11 on a carrier of a licensed frequency spectrum and by a different radio access node e.g. second radio access node 12, in the second cell 14 on a carrier of an unlicensed frequency spectrum. The different cells may in some embodiments be served by one and the same radio access node, e.g. second radio access node 12. The communication terminal 10 may be configured to be scheduled in the second cell 14 by the radio access node serving the first cell 11, i.e. cross-carrier scheduled in the second cell 14, e.g. by the first radio access node 13 or second radio access node 12.

Embodiments herein provide the communication terminal 10 for handling communication. The communication terminal 10 is configured to communicate with the radio access node in the first cell 11 on the carrier of the licensed frequency spectrum and to be cross-carrier scheduled in the second cell 14 on the carrier of the unlicensed frequency spectrum by the radio access node via the first cell 11.

The communication terminal 10 is configured to receive the indication that data may be scheduled for the communication terminal 10 on the data channel in the second cell 14. The communication terminal 10 may be configured to receive the indication that data may be scheduled for the communication terminal 10 by being configured to receive a reference signal on the second cell 14 that indicates to the communication terminal 10 that the carrier of the unlicensed frequency spectrum has been occupied by the second cell 14. The reference signal may in some embodiments further indicate to the communication terminal 10 whether the data channel is present in a subframe or not. In one alternative, the reference signal may be common for all communication terminals operating on the second cell 14. In another alternative, the reference signal may be specific to the communication terminal 10. In this case the reference signal may be located within the data channel.

Alternatively or additionally, the communication terminal 10 may be configured to receive the indication that data may be scheduled for the communication terminal 10 by being configured to receive on the first cell, control information of the second cell 14. The control information indicates where in a subframe the data channel is scheduled in the second cell 14 for the communication terminal 10. The communication terminal 10 may then be configured to attempt to detect the data channel in the subframe. The communication terminal 10 may be configured to receive the indication that data may be scheduled for the communication terminal 10 by being configured to receive a reference signal on the second cell 14 that indicates to the communication terminal 10 that the carrier of the unlicensed frequency spectrum has been occupied by the second cell 14.

The communication terminal 10 is configured to attempt to detect presence of the data channel intended for the communication terminal 10. The communication terminal 10 may be configured to detect presence of the data channel blindly.

The communication terminal 10 is further configured to, in case the communication terminal 10 detects presence of the data channel intended for the communication terminal 10, decode the data channel.

The communication terminal 10 is also configured to, in case the communication terminal 10 does not detect presence of the data channel intended for the communication terminal 10, indicate a non-detection of the data channel to the radio access node. The communication terminal may be configured to indicate the non-detection by being configured to transmit a NACK or a DTX state on the first cell 11.

The communication terminal may be configured to indicate the non-detection by being configured to indicate on the first cell 11 that the communication terminal 10 has received the scheduling DCI message but not received the data channel associated with the scheduling DCI message.

The communication terminal may be configured to receive on the first cell, the NDI bit, which NDI bit indicates how to indicate that the communication terminal 10 has received the scheduling DCI message but not received the data channel associated with the scheduling DCI message.

The communication terminal may be configured to reset the HARQ process when the data channel is detected and corresponds to information in the DCI message; or independently of whether the data channel is detected or not.

In some embodiments the data channel is scheduled with a DMRS based transmission scheme and the communication terminal 10 may be configured to attempt detect the data channel by being configured to search for a DMRS on scheduled PRBs, and based on an outcome of the searching, to judge whether or not the communication terminal 10 is scheduled in the PRBs.

In some embodiments the data channel is scheduled with a Cell Specific Reference Signal based transmission scheme; and the communication terminal 10 may be configured to attempt to detect the data channel by being configured to validate allocated PRBs. If the allocated PRBs are consistent with information given in the DCI message, to determine the data channel to be detected, and if the allocated PRBs are not consistent with the information given in the scheduling DCI message, the communication terminal 10 may be configured to determine the data channel not to be present.

The communication terminal 10 may be configured to attempt to detect presence of the data channel by being configured to correlate received reference signal sequences with a set of known sequences, and when the correlation is above a threshold for matching, the presence of the data channel intended for the communication terminal 10 is considered detected.

The communication terminal 10 may be configured, e.g. by comprising a receiving module 1201, to receive an indication that data may be scheduled for the communication terminal 10 in the second cell 14. The indication may be received on the first cell and/or on the second cell 14. In some embodiments, the indication may be control information, scheduling information or DCI of the second cell 14, which control information indicates where in a subframe data, PDSCH, is scheduled in the second cell 14.

The communication terminal 10 is configured, e.g. by comprising a detecting module 1202, to detect, e.g. independently of the received control information, a presence of PDSCH intended for the communication terminal 10 by comparing reference signals in a received transmission from the second radio access node 12.

In case the communication terminal 10 detects the presence of PDSCH intended for the communication terminal 10, the communication terminal 10 is configured, e.g. by comprising a decoding module 1203, to decode the PDSCH.

In case the control information indicates PDSCH but the communication terminal 10 does not detect the presence of PDSCH intended for the communication terminal 10, the communication terminal 10 is configured, e.g. by comprising an indicating module 1204, to indicate a non-detection of PDSCH on the first cell 11.

The receiving module 1201 may be configured to receive the indication that data may be scheduled for the communication terminal 10 by being configured to receive a reference signal on the second cell 14 that indicates to the communication terminal 10 that the carrier of the unlicensed frequency spectrum has been occupied by the second cell 14. The reference signal may in some embodiments further indicate to the communication terminal 10 whether the data channel is present in a subframe or not. In one alternative, the reference signal may be common for all communication terminals operating on the second cell 14. In another alternative, the reference signal may be specific to the communication terminal 10. In this case the reference signal may be located within the data channel. The receiving module 1201 may be configured to receive the indication that data may be scheduled for the communication terminal 10 on the data channel in the second cell 14. The receiving module 1201 may be configured to receive the indication that data may be scheduled for the communication terminal 10 by being configured to receive on the first cell, control information of the second cell 14. The control information indicates where in a subframe the data channel is scheduled in the second cell 14 for the communication terminal 10. The detecting module 1202 may then be configured to attempt to detect the data channel in the subframe.

The detecting module 1202 may be configured to attempt to detect presence of the data channel intended for the communication terminal 10. The detecting module 1202 may be configured to detect presence of the data channel blindly.

The decoding module 1203 may further be configured to, in case the detecting module 1202 detects presence of the data channel intended for the communication terminal 10, decode the data channel.

The indicating module 1204 may be configured to, in case the detecting module 1202 does not detect presence of the data channel intended for the communication terminal 10, indicate a non-detection of the data channel to the radio access node. The indicating module 1204 may be configured to indicate the non-detection by being configured to transmit a NACK or DTX state on the first cell 11.

The indicating module 1204 may be configured to indicate the non-detection by being configured to indicate on the first cell 11 that the communication terminal 10 has received the scheduling DCI message but not received the data channel associated with the scheduling DCI message.

The receiving module 1201 may be configured to receive on the first cell, the NDI bit, which NDI bit indicates how to indicate that the communication terminal 10 has received the scheduling DCI message but not received the data channel associated with the scheduling DCI message.

In some embodiments the data channel is scheduled with a DMRS based transmission scheme and the receiving module 1201 may be configured to attempt to detect the data channel by being configured to search for a DMRS on scheduled PRBs, and based on an outcome of the searching, to judge whether or not the communication terminal 10 is scheduled.

In some embodiments the data channel is scheduled with a Cell Specific Reference Signal based transmission scheme; and the detecting module 1202 may be configured to attempt to detect the data channel by being configured to validate allocated PRBs. If the allocated PRBs are consistent with the information given in the DCI message, the detecting module 1202 may be configured to determine the data channel to be detected, and if the allocated PRBs are not consistent with the information given in the scheduling DCI message, the detecting module 1202 may be configured to determine the data channel not to be present.

The detecting module 1202 may be configured to attempt to detect by being configured to correlate received reference signal sequences with a set of known sequences, and when the correlation is above a threshold for matching, the presence of the data channel intended for the communication terminal 10 is considered detected.

The embodiments herein for handling communication with the radio access node may be implemented through one or more processors 1205 in the communication terminal 10 depicted in FIG. 12, e.g. together with computer program code, which processor 1205 or processing means is configured to perform the functions and/or method actions of the embodiments herein.

The communication terminal 10 further comprises a memory 1206. The memory comprises one or more units to be used to store data on, such as DCI information, PQI information, reference signals, applications to perform the methods disclosed herein when being executed, and similar.

The methods according to the embodiments described herein for the communication terminal 10 may be implemented by means of e.g. a computer program 1207 or a computer program product, comprising instructions, i.e., software code portions, which, when executed on at least one processor, cause the at least one processor to carry out the actions described herein, as performed by the communication terminal 10. The computer program 1207 may be stored on a computer-readable storage medium 1208, e.g. a disc or similar. The computer-readable storage medium 1208, having stored thereon the computer program 1207, may comprise the instructions which, when executed on at least one processor, cause the at least one processor to carry out the actions described herein, as performed by the communication terminal 10. In some embodiments, the computer-readable storage medium 1208 may be a non-transitory computer-readable storage medium.

According to embodiments herein a method performed in a radio access node is provided. The radio access node schedules a communication terminal in a cross carrier manner, i.e. the radio access node schedules transmissions for the communication terminal in a first cell served by the radio access node, referred below as a first radio access node, but also for a second cell controlled by a different radio access node, referred below as a second radio access node, wherein the second cell is of or belongs to an unlicensed frequency spectrum. The first cell may be a primary cell and the second cell may be a secondary cell. The radio access node transmits control information to the communication terminal, which control information indicates where data is scheduled in the second cell. The radio access node receives an indication that the communication terminal has not received the data transmission. The radio access node adjusts or reschedules the data transmission based on the received indication.

According to embodiments herein a method performed in a communication terminal is provided. The communication terminal detects, independently of received control information, also referred to as blindly detecting, a presence of PDSCH intended for the communication terminal by comparing reference signals in a received transmission from the second radio access node. In case the communication terminal detects the presence of PDSCH intended for the communication terminal, the communication terminal decodes the PDSCH. In case control information indicates PDSCH but the communication terminal does not detect the presence of PDSCH intended for the communication terminal, the communication terminal indicates a non-detection of PDSCH to the first radio access node.

As will be readily understood by those familiar with communications design, functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication terminal or radio access node, for example.

Alternatively, several of the functional elements of the processor or processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a communication terminal for handling communication, which communication terminal is being served by a radio access node in a first cell on a carrier of a licensed frequency spectrum and cross-carrier scheduled in a second cell on a carrier of an unlicensed frequency spectrum by the radio access node via the first cell, the method comprising:
receiving an indication that data may be scheduled for the communication terminal on a data channel in the second cell;
attempting to detect presence of the data channel intended for the communication terminal;
in case the communication terminal detects presence of the data channel intended for the communication terminal, decoding the data channel; and in case the communication terminal does not detect presence of the data channel intended for the communication terminal, indicating a non-detection of the data channel to the radio access node.

2. The method according to claim 1, wherein the receiving the indication that data may be scheduled for the communication terminal comprises receiving, on the first cell, control information for the second cell, which control information indicates where in a subframe the data channel is scheduled in the second cell for the communication terminal and wherein the communication terminal attempts to detect the data channel in the subframe.

3. The method according to claim 1, wherein the receiving the indication that data may be scheduled for the communication terminal comprises receiving a reference signal on the second cell that indicates to the communication terminal that the carrier of the unlicensed frequency spectrum has been occupied by the second cell.

4. The method according to claim 3, wherein the reference signal further indicates to the communication terminal whether the data channel is present in a subframe or not, and wherein the communication terminal attempts to detect the data channel when the reference signal indicates that the data channel is present in the subframe.

5. The method according to claim 4, wherein the reference signal is common for all communication terminals operating on the second cell.

6. The method according to claim 4, wherein the reference signal specific to the communication terminal and located within the data channel.

7. The method according to claim 1, wherein the attempting to detect presence of the data channel comprises blindly detecting presence of the data channel.

8. The method according to claim 1, wherein the indicating a non-detection comprises indicating a Non-Acknowledgement, NACK, or Discontinuous Transmission, DTX, state on the first cell.

9. The method according to claim 1, wherein the indicating a non-detection of the data channel comprises to indicate on the first cell that the communication terminal has received a scheduling Downlink Control Information, DCI, message but not received the data channel associated with the scheduling DCI message.

10. The method according to claim 9, further comprising receiving on the first cell, a New Data Indicator, NDI, bit which NDI bit indicates how to indicate that the communication terminal has received the scheduling Downlink Control Information, DCI, message but not received the data channel associated with the scheduling DCI message.

11. The method according to claim 10, further comprising resetting an hybrid automatic request process when the data channel is detected and corresponds to information in the scheduling Downlink Control Information, DCI, message; or independently of whether the data channel is detected or not.

12. The method according to claim 1, wherein the data on the data channel is scheduled with a Demodulation Reference Signal, DMRS, based transmission scheme and wherein the attempting to detect the data channel comprises searching for a DMRS on scheduled Physical Resource Blocks, PRBs; and based on an outcome of the searching judging whether or not the data channel intended for the communication terminal 10 is scheduled in the PRBs.

13. The method according to claim 1, wherein the data on the data channel is scheduled with a Cell Specific Reference Signal based transmission scheme; wherein the attempting to detect the data channel comprises to validate allocated Physical Resource Blocks, PRBs, and if the allocated PRBs are consistent with information given in a scheduling Downlink Control Information, DCI, message, to determine the data channel to be detected, and if the allocated PRBs are not consistent with the information given in the scheduling DCI message, the data channel is determined not to be present.

14. The method according to claim 1, wherein the attempting to detect presence of the data channel comprises correlating received reference signal sequences with a set of known sequences, and when the correlation is above a threshold for matching, the presence of the data channel intended for the communication terminal is considered detected.

15. A method performed by a radio access node for handling communication with a communication terminal in a second cell on a carrier of an unlicensed frequency spectrum, wherein resources for communication with the communication terminal in the second cell are cross-carrier scheduled from a first cell on a carrier of a licensed frequency spectrum; the method comprising
transmitting an indication that data may be scheduled for the communication terminal on a data channel in the second cell.

16. The method according to claim 15, wherein the radio access node is configured to serve the communication terminal in the second cell on the carrier of the unlicensed frequency spectrum, wherein the transmitting the indication that data may be scheduled for the communication terminal comprises transmitting a reference signal on the second cell that indicates to the communication terminal that the carrier of the unlicensed frequency spectrum has been occupied by the second cell.

17. The method according to claim 16, wherein the reference signal further indicates to the communication terminal whether the data channel is present in a subframe transmitted on the second cell or not.

18. The method according to claim 17, wherein the reference signal is common for all communication terminals operating on the second cell.

19. The method according to claim 17, wherein the reference signal specific to the communication terminal and located within the data channel.

20. The method according to claim 15, wherein the data on the data channel is scheduled with a Demodulation Reference Signal, DMRS, based transmission scheme and the transmitting the indication that data may be scheduled for the communication terminal comprises transmitting, on scheduled Physical Resource Blocks, PRBs, a DMRS with a modified pattern that indicates presence of the data channel to the communication terminal.

* * * * *